US011454775B1

(12) United States Patent
McNutt

(10) Patent No.: US 11,454,775 B1
(45) Date of Patent: Sep. 27, 2022

(54) METHODS FOR FORMING CABLES WITH SHAPEABLE STRENGTH MEMBERS

(71) Applicant: Superior Essex International LP, Atlanta, GA (US)

(72) Inventor: Christopher W. McNutt, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 17/183,592

(22) Filed: Feb. 24, 2021

(51) Int. Cl.
  *G02B 6/44* (2006.01)
  *B29C 35/08* (2006.01)
  *B29L 11/00* (2006.01)

(52) U.S. Cl.
  CPC ........ *G02B 6/4432* (2013.01); *B29C 35/0805* (2013.01); *G02B 6/4486* (2013.01); *B29C 2035/0827* (2013.01); *B29L 2011/0075* (2013.01)

(58) Field of Classification Search
  CPC .............................. G02B 6/449; G02B 6/4434
  See application file for complete search history.

(56) References Cited

U.S. PATENT DOCUMENTS

| 4,661,406 A * | 4/1987 | Gruhn ................. | G02B 6/4407 385/103 |
| 4,781,434 A * | 11/1988 | Kitagawa ............ | G02B 6/4407 385/105 |
| 5,087,110 A * | 2/1992 | Inagaki ............... | G02B 6/4489 385/110 |
| 5,920,672 A * | 7/1999 | White ................. | G02B 6/4434 385/110 |
| 9,739,966 B2 | 8/2017 | Kachmar | |

FOREIGN PATENT DOCUMENTS

GB  2181090 A  * 4/1987  ....... B29D 11/00663

OTHER PUBLICATIONS

Office Action dated Jan. 27, 2022 for U.S. Appl. No. 17/183,597.

* cited by examiner

*Primary Examiner* — Charlie Y Peng

(57) ABSTRACT

A method for forming a cable may include providing a strength member that includes a plurality of strength fibers positioned within a shapeable resin material. A shape of the strength member may be modified along its longitudinal length while twisting the strength member with one or more fiber optic components. The modified shape of the strength member may then be fixed within a desired operating temperature range of the cable, and a jacket may be formed around the strength member and the one or more optical fiber components.

20 Claims, 10 Drawing Sheets

METHODS FOR FORMING CABLES WITH SHAPEABLE STRENGTH MEMBERS

CROSS-REFERENCE TO RELATED APPLICATION

The present application is related to U.S. patent application Ser. No. 17/183,597 filed on Feb. 24, 2021 and entitled "Cables with Shapeable Strength Members", which is incorporated by reference herein it its entirety.

TECHNICAL FIELD

Embodiments of the disclosure relate generally to optical fiber cables and, more particularly, to optical fiber cables that include strength members that can be shaped during cable construction.

BACKGROUND

Optical fiber cables are utilized in a wide variety of applications. Certain optical fiber cables incorporate strength members, such as strength rods, to provide anti-buckling support and/or to protect the optical fibers from compressive forces. The use of strength members may also improve the low temperature performance of a cable. Conventional strength members incorporated into fiber cables are formed with predetermined shapes. For example, flat strength members and round strength members are incorporated into conventional fiber cables. In many cases, the predetermined shapes of conventional strength members are not optimized for certain cable design. The incorporation of conventional strength members often results in increased cable diameters and/or cross-sectional areas. Certain conventional strength members, such as flat strength members, may also have undesirable preferential bends or undesirable spring back forces when incorporated into cables and twisted with optical fiber units.

Accordingly, there is an opportunity for improved optical fiber cables and methods for forming cables that include shapeable strength members. In particular, there is an opportunity for improved cables and associated formation methods that include strength members that can be shaped during cable formation and then fixed in the desired shape.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1A:
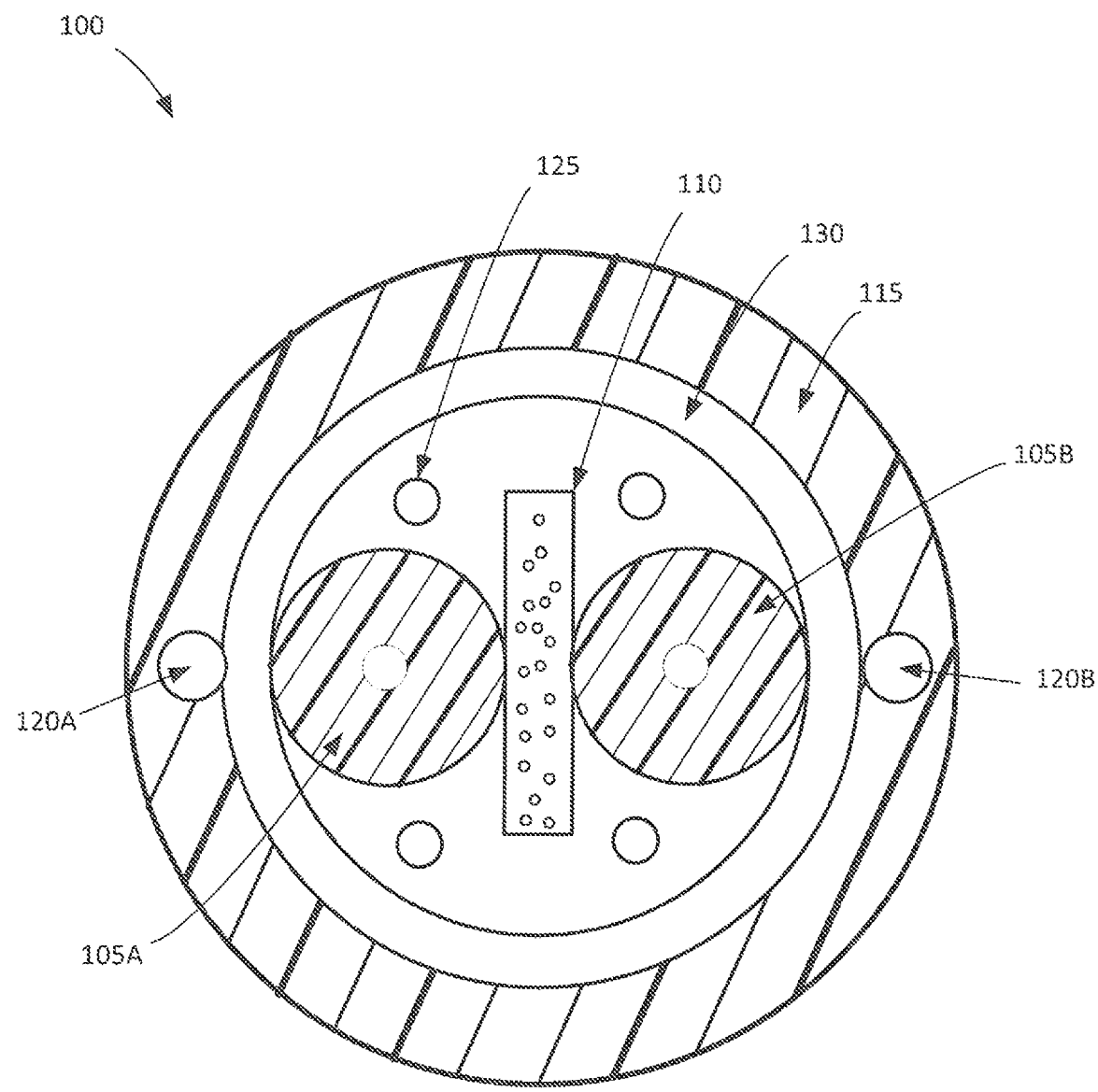
FIG. 1A is a cross-sectional view of an example optical fiber cable that includes a flat shapeable strength member, according to an illustrative embodiment of the disclosure.

Various embodiments of the present disclosure are directed to optical fiber cables and/or optical fiber hybrid cables that include strength members with optimized shapes. In certain embodiments, an optical fiber cable may include one or more fiber optic components and a strength member twisted with the one or more fiber optic components. A jacket may then be formed around the fiber optic component(s) and the strength member. A wide variety of suitable fiber optic components may be incorporated into a cable as desired, such as buffer tubes and/or tight buffered optical fibers. Additionally, the strength member may include a plurality of strength fibers positioned within a shapeable resin material. The shapeable resin material permits a shape of the strength member to be modified along its longitudinal length during formation of the cable as the strength member is twisted with (e.g., helically twisted, oscillating reverse twisted, wrapped around, etc.) the one or more fiber optic components. In certain embodiments, a position of the strength member relative to a longitudinally extending cross-sectional centerline of the cable may be varied along a longitudinal direction. For example, a cross-sectional shape or orientation of the strength member relative to a longitudinally extending cross-sectional centerline of the cable may be varied along a longitudinal direction. As a result, the shape of the strength member may be optimized for the cable design.

A wide variety of suitable strength fibers may be incorporated into a strength member as desired in various embodiments. Any suitable number of strength fibers may be incorporated into a strength member, and the strength fibers may have any suitable dimensions (e.g., diameters, cross-sectional areas, etc.). Additionally, in certain embodiments, the strength fibers may include longitudinally continuous strength fibers. In certain embodiments, the strength fibers may include a plurality of high tensile strength, high elastic modulus (i.e., relatively stiff) fibers. Examples of suitable fibers include, but are not limited to, glass fibers (e.g., E-glass, ECR-glass, R-glass, S-glass, etc.), liquid crystal polymer fibers, basalt fibers, boron fibers, polybenzoxazole ("PBO") fibers, and/or carbon fibers. These fibers may provide a strength member and a cable with a desired coefficient of thermal expansion and contraction, while providing increased anti-buckling support. As a result of being positioned within a shapeable resin material, it is still possible to shape a strength member during cable formation even with these fibers having a relatively high elastic modulus. In other embodiments, the strength fibers incorporated into a strength member may include a combination of high tensile strength, high elastic modulus fibers (e.g., glass fibers, etc.) and high tensile strength, low elastic modulus fibers, such as aramid fibers and/or ultra-high molecular weight polyethylene fibers. For example, a suitable number of high elastic modulus strength fibers may be utilized to provide a cable with a desired coefficient of thermal expansion and contraction, and/or desired anti-buckling support while low elastic modulus strength fibers are added to improve tensile strength. In certain embodiments, these designs may permit easier shaping of a strength member and/or allow the dimensions of a strength member to be optimized.

Additionally, a wide variety of suitable shapeable resin materials may be utilized in conjunction with a shapeable strength member in order to encapsulate the strength fibers. Examples of suitable resin materials include, but are not limited to, thermoplastic resin materials, thermoset resin materials, UV curable resin materials, cationic UV curable resin materials, and/or heat curable resin materials. During cable formation, a shapeable resin material may exist in a state that allows the resin material to be shaped and, therefore, permits a shape of the strength member to be modified as it is twisted with one or more fiber optic components. In certain embodiments, the shapeable resin material may be activated prior to the strength member being twisted with the fiber component(s). For example, a thermoplastic resin may be heated in order to soften the resin and allow a shape of the resin to be modified. As another example, cross-linking of a thermoset or other suitable resin may be initiated by heat, UV light, moisture, a catalyst, and/or other suitable methods. The resin may then be shaped in a relatively flexible state during cable formation and twisting with the fiber component(s). After a shape of a strength member has been modified during cable formation, the shapeable resin may be cured by any number of suitable methods, such as cooling, passage of time, UV light, heat, etc. In this regard, a modified shape of the strength member may be fixed for a desired operating temperature range of the cable. In other words, the strength member may maintain its modified shape as the cable is transported, installed, and utilized.

Other embodiments of the present disclosure are directed to methods for forming optical fiber cables and/or optical fiber hybrid cables including strength members that are shaped during cable assembly. In certain embodiments, a strength member that includes a plurality of strength fibers positioned within a shapeable resin material may be provided. The shape of the strength member may then be modified along its longitudinal length while the strength member is twisted with (e.g., helically twisted, oscillating reverse twisted, wrapped around, etc.) one or more fiber optic components. The modified shape of the strength member may then be fixed within a desired operating temperature range of the cable, and a jacket may be formed around the strength member and the optical fiber component(s).

As set forth in greater detail herein, a wide variety of suitable strength fibers and/or shapeable resin materials may be incorporated into a strength member as desired in various embodiments. Any number of suitable strength fibers may be incorporated into a strength member, and the strength fibers may have a wide variety of suitable dimensions. Additionally, a wide variety of suitable techniques may be utilized to cure a shapeable resin material following the modification of the strength member's shape. Examples of suitable techniques include, but are not limited to, cooling, passage of time for a resin that has a time delay for full curing, UV curing, heat curing, etc.

In certain embodiments, a shapeable resin material may be activated prior to modifying the shape of the strength member. For example, a shapeable resin material may be heated (e.g., a thermoplastic resin may be heated, etc.) prior to modifying the shape of a strength member. As another example, cross-linking of a thermoset or other suitable shapeable resin may be initiated by heat, UV light, moisture, a catalyst, and/or other suitable methods. The resin may then be shaped in a relatively flexible state during cable formation and twisting of the strength member with the fiber component(s).

According to an aspect of the disclosure, the shape of a strength member may be modified along its longitudinal length as the strength member is twisted with one or more fiber optic components. In certain embodiments, the shape of the strength member may also be modified as a result of the fiber optic component(s) being pressed into the strength member during cable formation. For example, as the strength member and fiber optic component(s) are bunched and/or twisted, one or more of the fiber optic components may press into an outer periphery of the strength member and form concave portions or channels into which the fiber optic component(s) are positioned. Once the shapeable resin material is cured, the strength member will maintain its modified shape without trying to return or spring back to its original shape. By contrast, if a conventional strength member is twisted with one or more fiber components, a spring back force will cause the strength member to try to untwist and return to its original shape, which will impart undesired forces onto adjacent fiber components. As a result of utilizing a shapeable strength member, a strength member may be produced and, as desired, packaged and shipped in an original shape that is optimized for production and transport. The strength member may then be reshaped during cable formation such that the shape of the strength member is optimized for a cable design.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For purposes of this disclosure, the term "shapeable strength member" means a fiber reinforced strength element that may be incorporated into an optical fiber or hybrid cable and twisted with one or more optical fiber components. Additionally, the shapeable strength member may be a fiber reinforced strength member that includes strength fibers encapsulated or positioned within a shapeable resin material. The shapeable strength member may be constructed with a first or initial shape, and the first shape may be modified along a longitudinal length of the strength member as the strength member is twisted with the one or more optical fiber components. The modified or second shape may then be fixed such that it does not change within a desired operating temperature range of the cable. In other words, the strength member will not attempt to spring back or return to its first or initial shape.

The term "shapeable resin material" or "shapeable resin" means a suitable polymeric material or material that can be cured into a polymeric material (a) that encapsulates strength fibers within a strength member, and (b) that may be shaped or worked during formation of a cable and then cured in order to maintain its modified shape. In certain embodiments, a shapeable resin material may be a thermoplastic resin or thermoplastic polymeric material. In other embodiments, a shapeable resin material may be a material that can be cured via ultraviolet ("UV") light, heat and/or other techniques. For example, a shapeable resin material may be a thermoset material, a UV curable resin, a cationic UV curable resin, or a heat curable resin material. In certain embodiments, a shapeable resin material may be activated prior to a strength member being twisted with one or more fiber component(s). For example, a thermoplastic resin may be activated by heating. As another example, cross-linking of a thermoset or other suitable resin may be initiated by heat, UV light, moisture, a catalyst, and/or other suitable methods. Regardless of steps taken to activate a resin, the shapeable resin may be shaped while in a relatively flexible state during cable formation. The shapeable resin may be cured by any number of suitable methods, such as cooling, passage of time, UV light, heat, etc. In this regard, a modified shape of the shapeable resin material and the strength member may be fixed.

The term "twisting" means any suitable twinning, spirally, or wrapping of a shapeable strength member with one or more optical fiber components. In certain embodiments, a shapeable strength member may be helically twisted with the one or more optical fiber components. In other embodiments, a shapeable strength member may be oscillating reverse twisted with the one or more optical fiber components. In yet other embodiments, a shapeable strength member may be wrapped (e.g., helically wrapped, etc.) around the one or more optical fiber components. Regardless of the manner in which twisting is formed, the shapeable strength member and the one or more optical fiber components may be twisted at any suitable twist lay, lay length, and/or other suitable twist rate as desired in various embodiments. For example, the strength member and the optical fiber component(s) may be twisted at a lay length between approximately 10 mm and approximately 1500 mm. In various embodiments, a twist lay length may be approximately 10, 15, 20, 25, 30, 40, 50, 60, 75, 80, 100, 150, 200, 250, 300, 400, 500, 600, 750, 900, 1000, 1250, or 1500 mm, a lay length included in a range between any two of the above values, or a range bounded on either a minimum or maximum end by one of the above values.

Shapeable strength members may be incorporated into a wide variety of suitable optical fiber cables and/or hybrid cables that include one or more optical fiber components (e.g., hybrid cables that combine optical fibers with other suitable transmission media such as power conductors, twisted pairs, etc.). These cables may include, for example, drop cables, horizontal cables, vertical cables, flexible cables, plenum cables, riser cables, all-dielectric self-supporting ("ADSS") cables, or any other appropriate cables.

According to an aspect of the disclosure, a shapeable strength member may have an initial or first shape that is modified during formation of a cable. A shapeable strength member may be constructed with an initial shape that may be more suitable for fabrication, packaging, and/or transportation of the strength member. As desired, shapeable strength members may be formed with a wide variety of suitable initial shapes as desired in various embodiments of the disclosure. Examples of suitable initial shapes include, but are not limited to, strength members having a flat cross-sectional shape (e.g., a relatively flat rectangular shape, etc.), strength members having a circular cross-sectional shape, and/or strength members having a cross-filler or plus-sign cross-sectional shape.

Figure 1B:
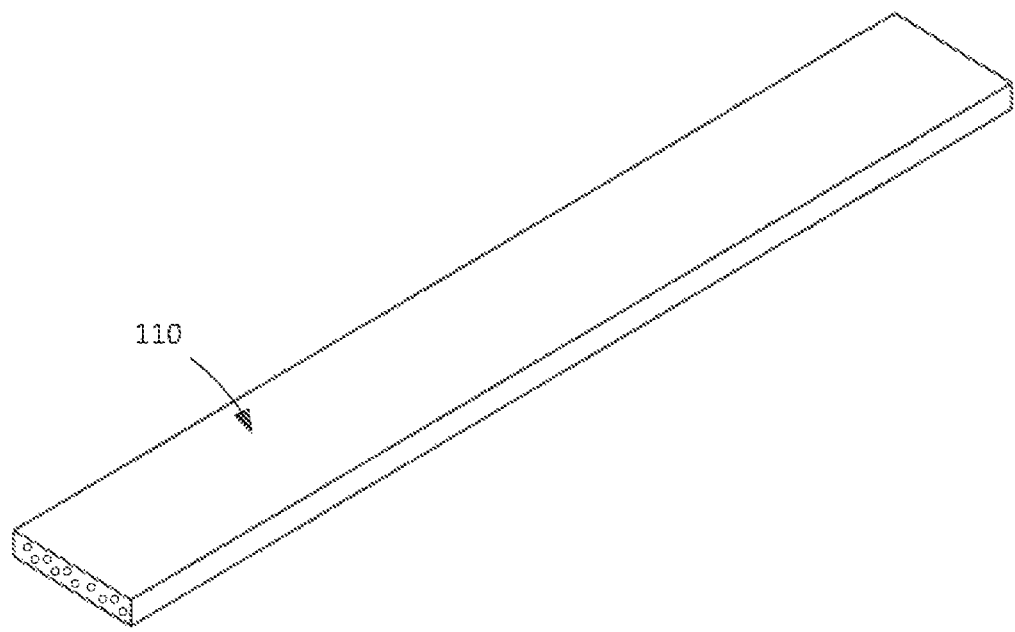
FIGS. 1B and 1C are perspective views of an example shapeable strength member that includes a flat cross-sectional shape, according to illustrative embodiments of the disclosure.
Figure 1C:
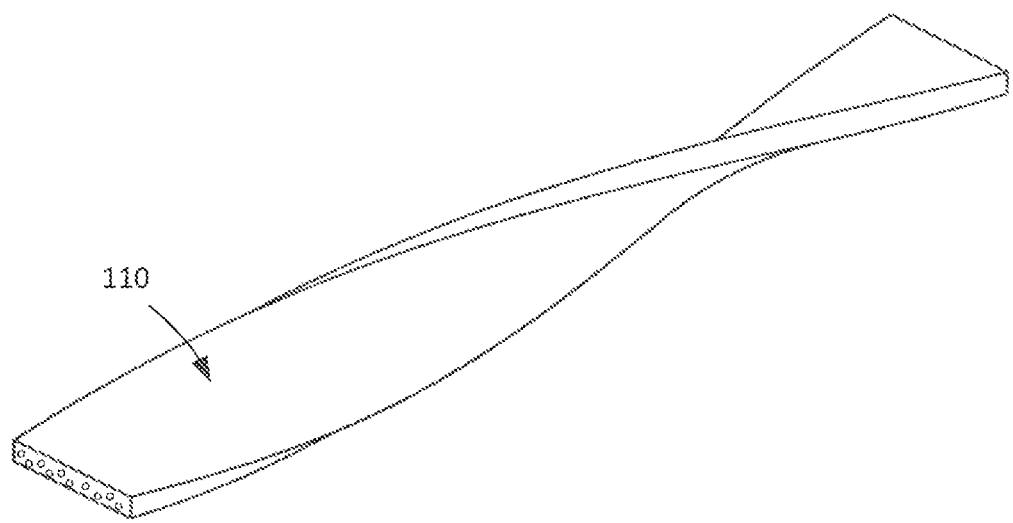
Figure 2A:
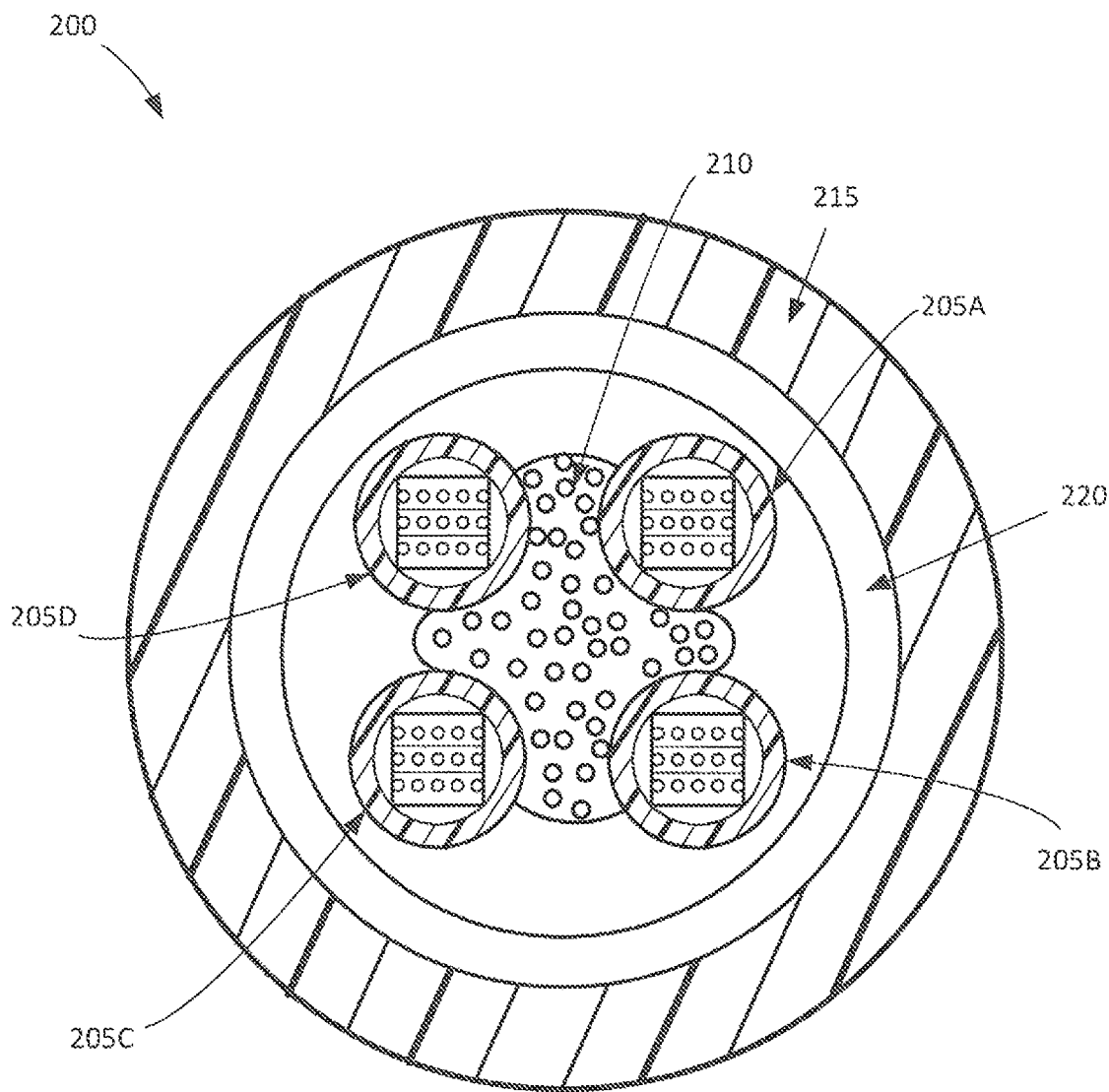
FIG. 2A is a cross-sectional view of an example optical fiber cable that includes a circular shapeable strength member, according to an illustrative embodiment of the disclosure.
Figure 2B:
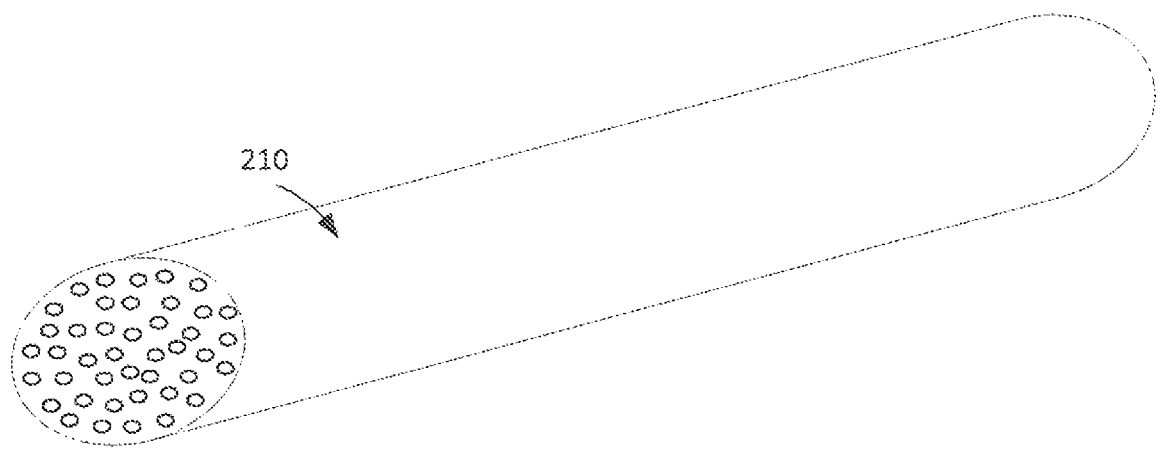
FIGS. 2B and 2C are perspective views of an example shapeable strength member that includes a circular cross-sectional shape, according to illustrative embodiments of the disclosure.
Figure 2C:
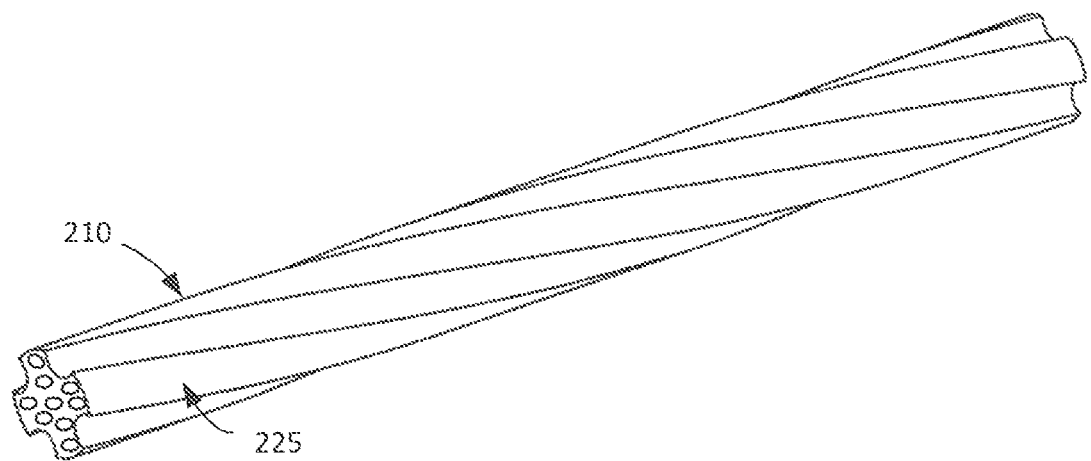
Figure 3A:
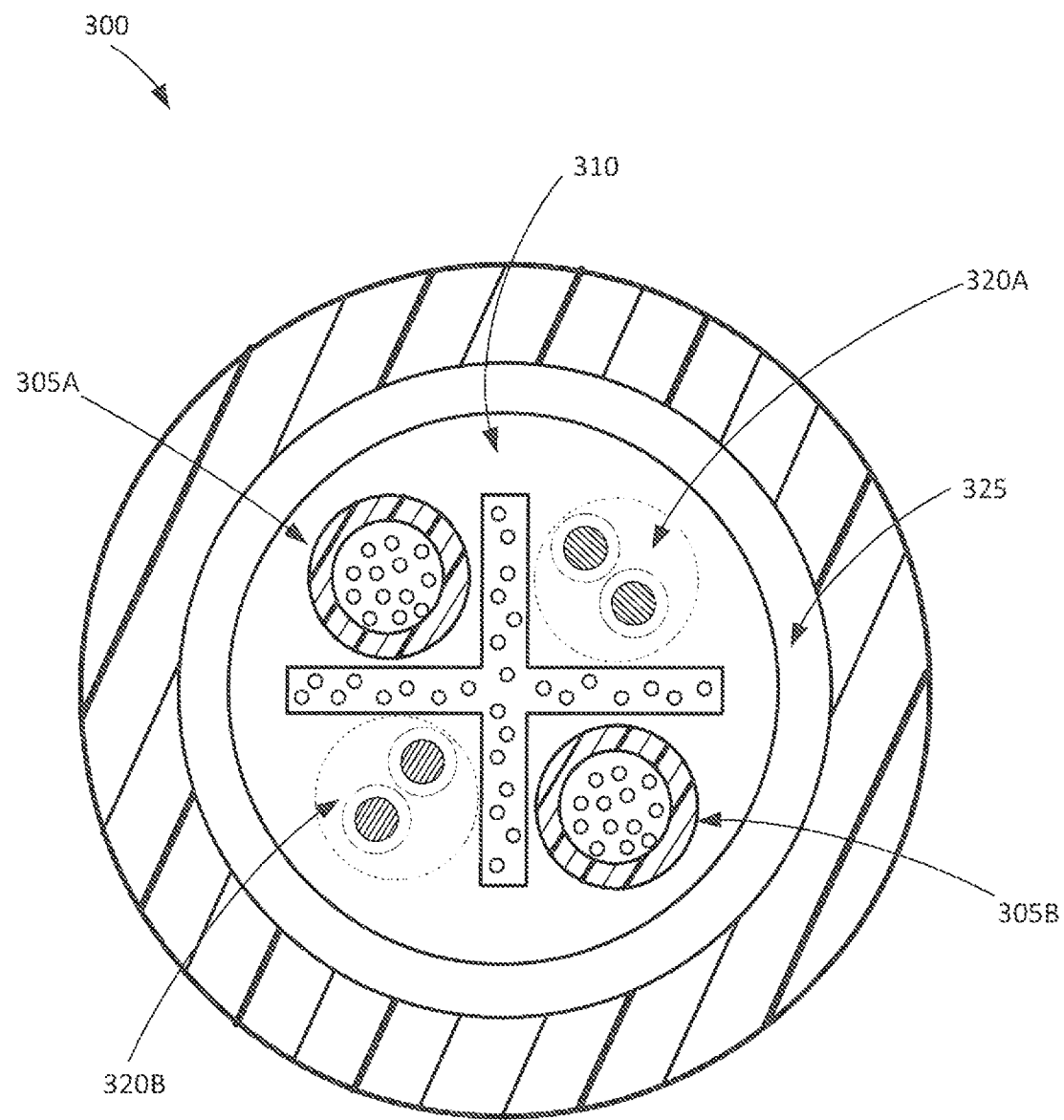
FIG. 3A is a cross-sectional view of an example optical fiber cable that includes a cross-shaped shapeable strength member, according to an illustrative embodiment of the disclosure.
Figure 3B:
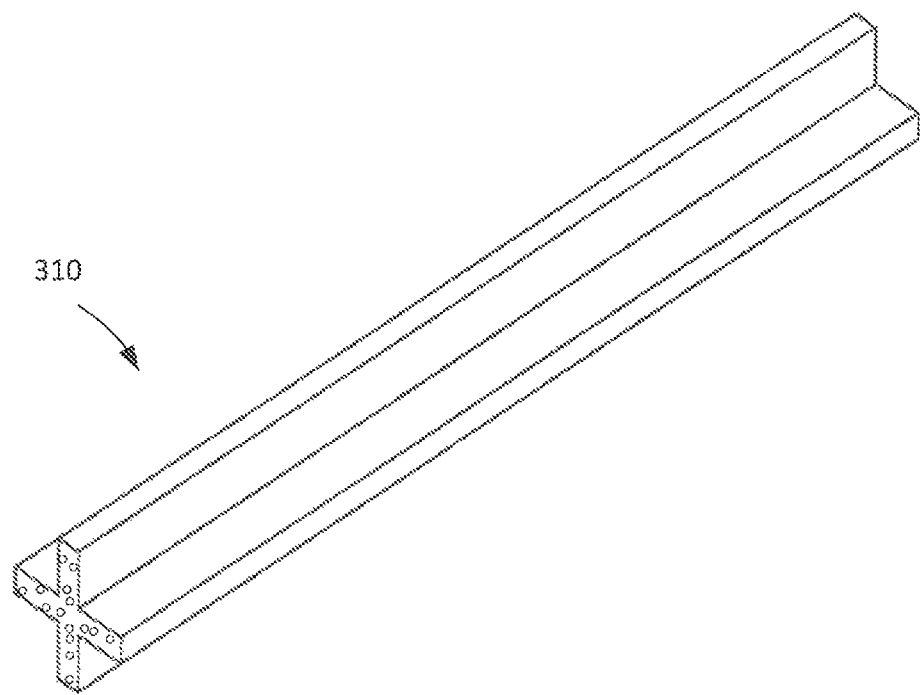
FIGS. 3B and 3C are perspective views of an example cross-filler shapeable strength member, according to illustrative embodiments of the disclosure.
Figure 3C:
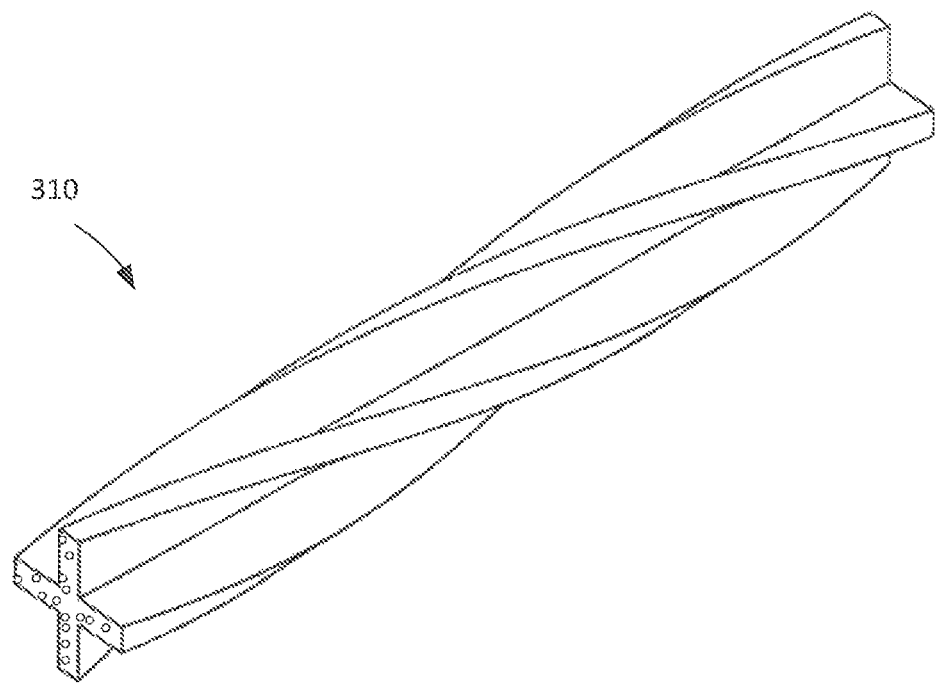
Figure 4A:
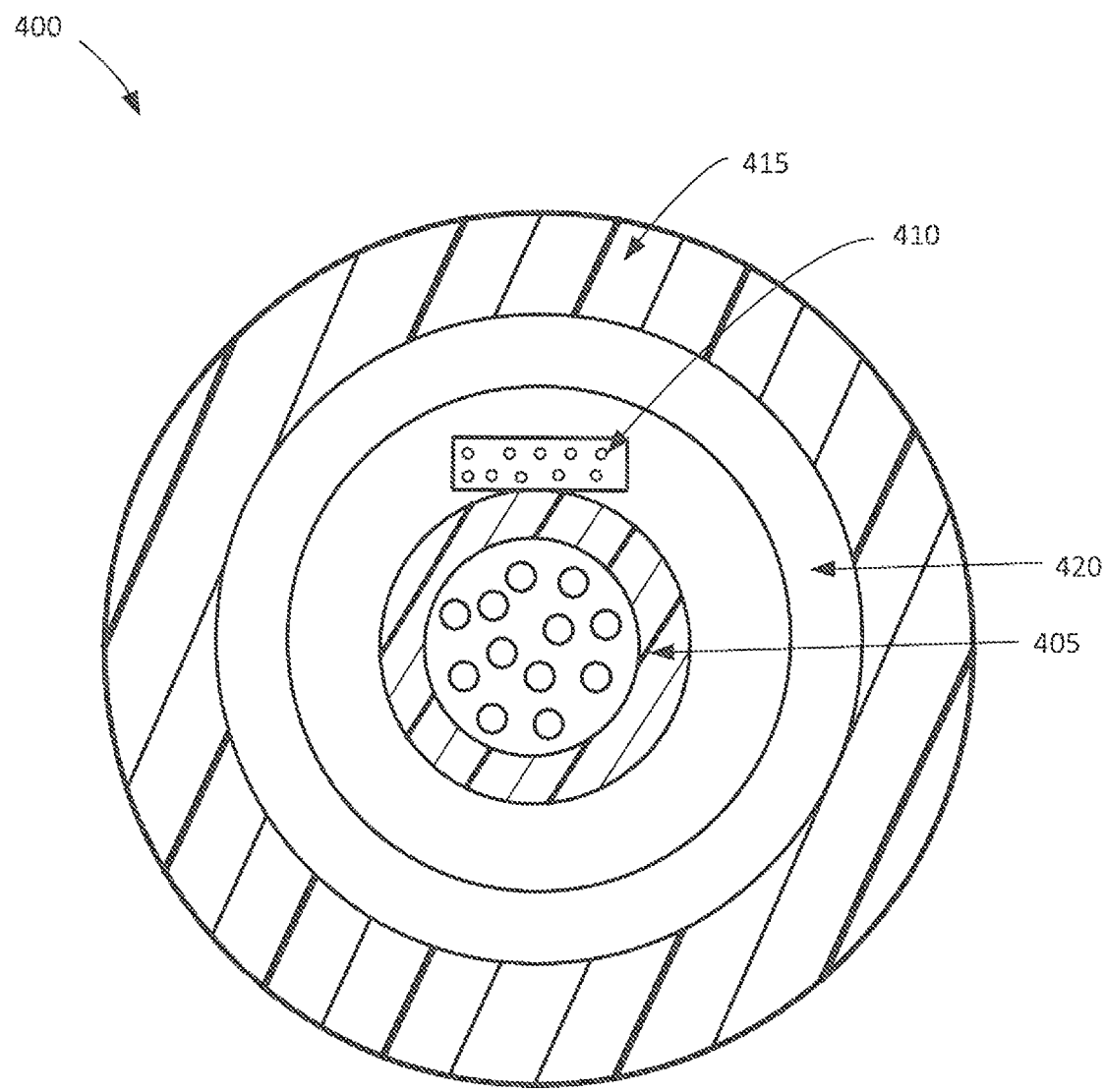
FIG. 4A is a cross-sectional view of an example optical fiber cable that includes a shapeable strength member that is wrapped around one or more fiber optic components, according to an illustrative embodiment of the disclosure.
Figure 4B:
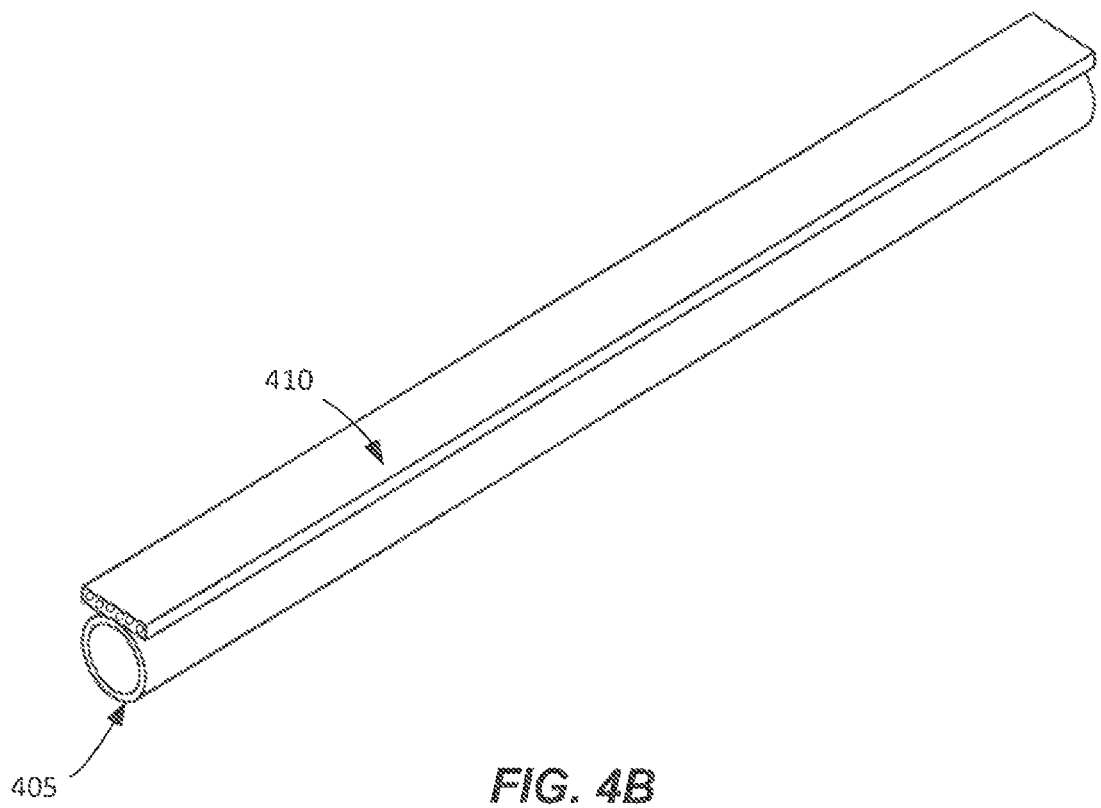
FIGS. 4B and 4C are perspective views of an example shapeable strength member before and after it is wrapped around one or more fiber optic components, according to illustrative embodiments of the disclosure.
Figure 4C:
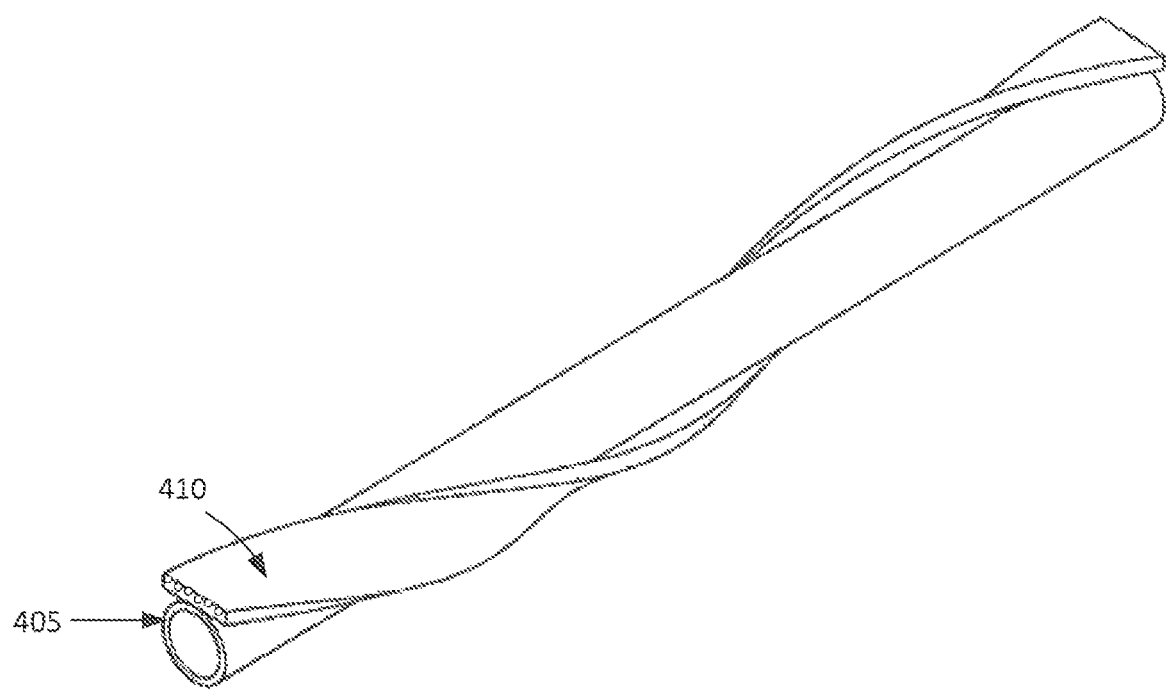

A few example shapeable strength members are described in greater detail below with reference to FIGS. 1A-4C. These figures illustrate example cable constructions and/or designs that may incorporate shapeable strength members. Additionally, example shapeable strength members are illustrated with both example initial shapes and example modified shapes. In particular, FIGS. 1A-1C illustrate an example optical fiber cable that incorporates a flat shapeable strength member, as well as example initial and modified shapes for the flat shapeable strength member. FIGS. 2A-2C illustrate an example optical fiber cable that incorporates a circular or round shapeable strength member, as well as example initial and modified shapes for the circular shapeable strength member. FIGS. 3A-3C illustrate an example optical fiber cable that incorporates a cross-filler shapeable strength member, as well as example initial and modified shapes for the cross-filler shapeable strength member. Finally, FIGS. 4A-4C illustrate an example optical fiber cable in which a flat shapeable strength member is twisted around one or more optical fiber components by helically wrapping the strength member around the component(s), as well as initial and modified shapes of the strength member. Other shapeable strength members having different initial and/or modified shapes may be utilized in other embodiments of the invention. Additionally, shapeable strength members may be incorporated into a wide variety of suitable cable designs provided that the shapeable strength members are twisted with one or more optical fiber components. The illustrated shapeable strength members and cable designs described herein are provided by way of non-limiting example only.

Turning now to FIG. 1A, a cross-sectional view of a first example optical fiber cable 100 is illustrated. The cable 100 is illustrated as including two optical fiber components 105A, 105B, a shapeable strength member 110 twisted with the optical fiber components 105A, 105B, and a jacket 115 formed around the optical fiber components 105A, 105B and the shapeable strength member 110. As desired, the cable 100 may include a wide variety of other components, such as strength rods 120A, 120B, strength yarns 125, ripcords, water swellable components, and/or an inner wrap 130 (e.g., a water swellable wrap, an inner jacket, etc.). Each of these components is described in greater detail below.

Any number of optical fiber components may be incorporated into a cable, such as the cable 100 of FIG. 1A, as desired in various embodiments of the disclosure. Additionally, each of the optical fiber components may have any suitable dimensions (e.g., diameters, cross-sectional areas, etc.) and may contain any desired number of optical fibers. As shown in FIG. 1A, the optical fiber components 105A, 105B may be tight buffered optical fibers. Other types of optical fiber components may be incorporated into a cable as desired, such as loose buffer tubes, microtubes, etc. FIGS. 2A, 3A, and 4A, which are described in greater detail below, illustrate a few example cables that incorporate buffer tubes as optical fiber components. It will be appreciated that a wide variety of different types of optical fiber components may be incorporated into cables as desired and twisted with shapeable strength members.

With continued reference to FIG. 1A, each tight buffered optical fiber component (referred to generally as tight buffer 105) may include an optical fiber and a tight buffer layer formed around the optical fiber. The optical fiber may include at least one core and a cladding formed around the core. In certain embodiments, the optical fiber may include a single core. In other embodiments, the optical fiber may include multiple cores. The core may be configured to propagate light at one or more desirable wavelengths (e.g., 1310 nm, 1550 nm, etc.) and/or at any desired transmission rate or data rate, such as a transmission rate between approximately 10 Giga bits per second ("Gbps") and approximately 40 Gbps. The cladding may have a lower index of refraction than that of the core, to facilitate propagation of a signal through the core. The core and the cladding may include any suitable compositions and may be formed from a wide variety of suitable materials, such as glass, glassy substance(s), one or more silica materials, one or more plastic materials, or a suitable combination of materials.

A wide variety of different types of optical fibers may be utilized as desired in various embodiments. For example, an optical fiber may be a single mode fiber, multi-mode fiber, or some other suitable optical waveguide that carries data. The optical fiber may also have any suitable cross-sectional diameter or thickness. For example, a single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, one or more protective coatings may be formed on or around the cladding of the optical fiber. The protective coating(s) may protect the optical fiber from physical, mechanical, and/or environmental damage. For example, the protective coating(s) may protect against mechanical stresses, scratches, and/or moisture damage. In the event that multiple protective coatings are utilized, the coatings may be applied in concentric layers. In certain embodiments, a dual-layer protective coating approach may be utilized. An inner primary coating may be formed around the cladding, and an outer secondary coating may be formed around the inner coating. The outer secondary coating may be harder than the inner primary coating. In this regard, the inner primary coating may function as a shock absorber to minimize attenuation caused by microbending, and the outer secondary coating may protect against mechanical damage and act as a barrier to lateral forces. Other configurations of protective coating(s) may be utilized as desired in various embodiments. Additionally, the protective coating(s) may be formed from a wide variety of suitable materials and/or combinations of materials. A few example materials include, but are not limited to acrylates, acrylate resins, ultraviolet ("UV")-cured materials, urethane acrylate composite materials, etc.

A tight buffer layer may then be formed on the protective coating(s) or, in embodiments with no protective coating formed on the cladding, directly on the cladding. In a tight buffer configuration, the buffer layer may be formed in intimate contact with an underlying layer along a longitudinal length of the optical fiber. In other words, the buffer layer may encapsulate the underlying optical fiber and protective coating(s) at any given cross-section of the optical fiber taken along a longitudinal direction. In a typical tight buffered configuration, a buffer layer will be in intimate contact with an underlying optical fiber along an entire outer surface of the optical fiber. In other embodiments, a buffer layer may be formed to be in intimate contact with only a portion of an outer surface of the optical fiber. For example, relatively small channels or other spaces may be positioned in the buffer layer at desired locations along an outer periphery and/or outer surface of the optical fiber in order to reduce buffer material and/or facilitate easier stripping of the buffer layer.

In certain embodiments, one or more intermediate layers may be positioned between the buffer layer and the optical fiber. For example, a suitable release layer may be positioned between the optical fiber and the buffer layer in order to facilitate easier stripping of the buffer layer from the optical fiber. In other embodiments, one or more substances or materials (e.g., water blocking powder, water blocking gel, etc.) may be applied to an outer surface of the optical fiber prior to formation of the buffer layer.

A wide variety of suitable materials and/or combinations of materials may be utilized to form the buffer layer. For example, the buffer layer may be formed from one or more suitable polymeric materials and/or thermoplastic materials. Examples of suitable materials include, but are not limited to polypropylene ("PP"), polyvinyl chloride ("PVC"), a low smoke zero halogen ("LSZH") material, polyethylene ("PE"), nylon, polybutylene terephthalate ("PBT"), polyvinylidene fluoride ("PVDF"), fluorinated ethylene propylene ("FEP"), etc. In various embodiments, a polymeric material may include a single material component or a mixture of various components. Additionally, in certain embodiments, the buffer layer may be formed as a single layer. In other embodiments, the buffer layer may include a plurality of layers, such as a plurality of co-extruded or successively extruded layers. In the event that a plurality of layers are utilized, in certain embodiments, each layer may be formed from the same or from similar materials. In other embodiments, at least two layers may be formed from different materials. In certain embodiments, one or more polymeric and/or thermoplastic material(s) may form a base material of the buffer layer, and one or more additives may be combined, mixed, or blended with the base material. For example, one or more slip agents or release agents may be optionally combined with the base material. The slip agents may facilitate relatively easier stripping of the buffer layer 404 from the underlying optical fiber. As desired, a slip agent and/or other additives may be combined with a base material with any suitable mix rates or blend rates.

In certain embodiments, an inner diameter of the buffer layer may be approximately equal to an outer diameter of the optical fiber and/or any intermediate layers. The buffer layer 404 may also be formed with any suitable outer diameter. For example, in certain embodiments, the buffer layer may be extruded or otherwise formed to have an outer diameter that is less than approximately 1.0 mm, such as an outer diameter of approximately 900 microns or micrometers. In other embodiments, the buffer layer may be formed to have an outer diameter of approximately 200, 250, 300, 400, 500, 600, 700, 800, 900, or 1000 microns, an outer diameter included in a range between any two of the above values, or an outer diameter included in a range bounded on a maximum end by one of the above values. Other suitable outer diameters may be utilized as desired for the buffer layer. Further, the buffer layer may be formed with a wide variety of suitable thicknesses (i.e., a difference between an inner and outer diameter) as desired in various embodiments. In certain example embodiments, the buffer layer may have a thickness between approximately 50 microns and approximately 875 microns.

With continued reference to FIG. 1A, a shapeable strength member 110 may be positioned adjacent to the optical fiber components 105A, 105B (e.g., the tight buffered fibers) and twisted with the fiber components 105A, 105B. Although a single strength member 110 is illustrated in the cable 100 of FIG. 1A, a plurality of shapeable strength members may be incorporated into a cable 100 as desired in other embodiments. For example, a cable 100 may be formed with a plurality of optical fiber components and respective shapeable strength members may be twisted with associated optical fiber components and/or subsets of the plurality of optical fiber components. In yet other embodiments, the cable 100 may be formed as a hybrid cable that includes a plurality of shapeable strength members that are selectively twisted with internal components of the cable 100.

The strength member 110 may have a wide variety of dimensions, shapes, and/or designs. For example, as shown in FIG. 1A, the strength member 110 may have a relatively flat rectangular cross-sectional shape. A strength member 110 may have a wide variety of other suitable cross-sectional shapes as desired in other embodiments. For example, as shown in FIGS. 2A-2C, a strength member may be formed with a round or circular cross-sectional shape. As another example, as shown in FIGS. 3A-3C, a strength member may be formed with a cross-filler, plus, or X-shaped cross-sectional shape. In other embodiments, a strength member 110 may have a T-shaped, a Y-shaped, a J-shaped, an L-shaped, or a diamond-shaped cross-sectional shape. In yet other embodiments, a strength member may have a cross-sectional shape having any number of spokes extending from a central point, walls or channels having varying thicknesses, T-shaped members extending from a central point, or a wide variety of other suitable shapes. Additionally, as desired, the corners of a cross-sectional shape of a strength member may be sharp, smooth, curved, rounded, truncated, or otherwise formed.

Additionally, a strength member 110 may be formed with a wide variety of suitable dimensions, such as any suitable widths, heights, thicknesses, diameters, and/or cross-sectional areas. In certain embodiments, the dimensions of the strength member 110 may be based at least in part upon a number of optical fiber components (e.g., components 105A, 105B) twisted with the strength member 110 and/or the size of the optical fiber components. The example flat strength member 110 illustrated in FIG. 1A may have a longer side length or height of approximately 1.0 mm and a shorter side length or thickness of approximately 0.3 mm. In certain embodiments, a flat strength member 110 may have a longer side length of approximately 0.5, 1.0, 2.0, 3.0, 4.0, 5.0, 6.0, 7.0, 8.0, 9.0, or 10.0 mm, a longer side length included in a range between any two of the above values, or a longer side length included in a range bounded on a minimum or maximum end by one of the above values. Additionally, a flat strength member 110 may have a shorter side length of approximately 0.01, 0.025, 0.05, 0.075, 0.1, 0.15, 0.2, 0.25, 0.3, 0.4, or 0.5 mm, a shorter side length included in a range between any two of the above values, or a shorter side length included in a range bounded on a minimum or maximum end by one of the above values.

According to an aspect of the disclosure, the strength member 110 may include a plurality of strength fibers positioned within or encapsulated within a shapeable resin material. A wide variety of suitable strength fibers 110 may be incorporated into a strength member as desired in various embodiments. In certain embodiments, the strength fibers may include a plurality of high tensile strength, high elastic modulus (i.e., relatively stiff) fibers. For example, the strength fibers may have an elastic modulus of at least approximately 30 GPa. In certain embodiments, the strength fibers may have an elastic modulus of at least approximately 40 GPa. The fibers may also have a tensile strength of at least approximately 300 GPa. Examples of suitable fibers include, but are not limited to, E-glass fibers, ECR or E-CR glass fibers, R-glass fibers, S-glass fibers, other suitable glass fibers or fiberglass components, liquid crystal polymer fibers, basalt fibers, boron fibers, polybenzoxazole ("PBO") fibers, and/or carbon fibers. These fibers may provide a strength member 110 and a cable 100 with a desired coefficient of thermal expansion and contraction, while providing increased anti-buckling support. As a result of being positioned within a shapeable resin material, it is still possible to shape the strength member 110 during cable formation even with these fibers having a relatively high elastic modulus.

In other embodiments, the strength fibers incorporated into a strength member 110 may include a combination of high tensile strength, high elastic modulus fibers (e.g., glass fibers, etc.) and high tensile strength, low elastic modulus strength fibers, such as aramid fibers and/or ultra-high molecular weight polyethylene fibers. In certain embodiments, low elastic modulus strength fibers may have an elastic modulus below approximately 30 GPa. The low elastic modulus fibers may also have a tensile strength of at least approximately 2000 MPa. While the low elastic modulus fibers may improve the tensile strength and a coefficient of thermal expansion of a strength member 110 and/or a cable 100, these fibers may provide limited anti-buckling support. In certain embodiments, a suitable number of high elastic modulus strength fibers may be utilized to provide a cable with desired anti-buckling support while low elastic modulus strength fibers are added to improve tensile strength and/or a coefficient of thermal expansion. In certain embodiments, designs that incorporate a combination of high elastic modulus and lower elastic modulus fibers may permit easier shaping of the strength member 110 and/or allow the dimensions of a strength member 110 to be optimized for cable designs. Indeed, different types of strength fibers may be mixed or blended as desired to suit the needs of a given cable construction.

Any suitable number of strength fibers may be incorporated into a strength member 110 as desired. The strength fibers may also have any suitable dimensions, such as any suitable diameters, cross-sectional areas, etc. In certain embodiments, the strength fibers incorporated into a strength member may have diameters between approximately 3 μm and approximately 125 μm. For example, the strength fibers may have diameters of approximately 3, 5, 10, 20, 25, 30, 35, 40, 50, 60, 75, 80, 90, 100, 110, or 125 μm, diameters included in a range between any two of the above value, or diameters included in a range bounded on either a minimum or maximum end by one of the above values. Additionally, strength fibers may be incorporated into a strength member 110 with any suitable filling ratio between the cross-sectional area occupied by the strength fibers relative to the total cross-sectional area of the strength member 110. In certain embodiments, a filling ratio of the strength fibers may be between approximately 25% and approximately 95%, such as approximately 80%. In various embodiments, the filling ratio may be approximately 25, 30, 35, 40, 50, 60, 70, 75, 80, 90, or 95%, a ratio included in a range between any two of the above values, or a ratio included in a range bounded on a minimum or maximum end by one of the above values.

Additionally, in certain embodiments, at least a portion of the strength fibers incorporated into the strength member 100 may be longitudinally continuous strength fibers. In other words, the strength fibers may extend along an entire longitudinal length of the strength member 110 and/or the cable 100. Longitudinally continuous strength fibers may provide greater anti-buckling support for the cable 100. In other embodiments, a first portion of the strength fibers may be longitudinally continuous while a second portion of the strength fibers are not longitudinally continuous. For example, shorter strength fibers may be mixed or blended with continuous strength fibers. Any suitable mixing or blending ratio between continuous and non-continuous strength fibers may be utilized as desired in various embodiments.

As a result of incorporating strength fibers, the strength member 110 may have a desired tensile strength, a desired coefficient of thermal expansion and contraction, and/or desired anti-buckling support. In certain embodiments, the strength member 110 may have a tensile strength of at least approximately 2000 MPa. In various embodiments, the strength member 110 may have a tensile strength of approximately 2000, 2500, 3000, 4000, 5000, 6000, 7000, 7500, or 8000 MPa, a tensile strength included in a range between any two of the above values, or a tensile strength included in a range bounded on a minimum end by one of the above values. In certain embodiments, the strength member 110 may have a coefficient of thermal expansion and contraction of approximately $5.5 \times 10^{-7} K^{-1}$ or lower. In various embodiments, the strength member may have a coefficient of thermal expansion and contraction of approximately $4.5 \times 10^{-7} K^{-1}$, $5.5 \times 10^{-7} K^{-1}$, $6.5 \times 10^{-7} K^{-1}$, $7.5 \times 10^{-7} K^{-1}$, $8.5 \times 10^{-7} K^{-1}$, or $9.5 \times 10^{-7} K^{-1}$, a coefficient included in a range between any two of the above values, or a coefficient included in a range bounded on a maximum end by one of the above values.

With continued reference to the strength member 110 of FIG. 1, the strength fibers may be positioned within or encapsulated within a shapeable resin material. A wide variety of suitable shapeable resin materials may be utilized in conjunction with the strength member 110. Examples of suitable resin materials include, but are not limited to, thermoplastic resin materials, thermoset resin materials, free radical UV curable resin materials, cationic UV curable resin materials, heat curable resin materials, and/or various combinations of any of the materials mentioned herein. In the event that the shapeable resin material is formed from a thermoplastic material, a softening temperature of the thermoplastic material may exceed a maximum operating temperature of the cable 100 such that the resin material can be shaped during cable formation but will remain fixed when the cable is in use. Examples of suitable thermoplastic materials that may be utilized as shapeable resin materials include, but are not limited to, one or more polymeric materials, polyvinyl chloride ("PVC"), polyurethane, a fluoropolymer, polyethylene, neoprene, cholorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, polyphenylene sulfide ("PPS"), polyvinylidene fluoride ("PVDF"), polyetheretherketone ("PEEK"), polypropylene, polystyrene, polyamide, plastic, rubber, acrylic, or some other appropriate material known in the art, or a combination of suitable materials.

As an alternative to utilizing one or more thermoplastic resin materials, the shapeable resin material may include one or more thermoset materials, such as one or more UV curable or heat curable thermoset resin materials. In certain embodiments, the shapeable resin material may include a cross-linkable thermoset material. Prior to and/or during cable formation, cross-linking of the material may be initiated by heat, UV light, moisture, a catalyst, or another suitable method, thereby permitting the resin to be applied around the strength fibers while maintaining a relatively flexible shape. Once a shape of the strength member 110 has been modified as the strength member 110 is twisted with one or more optical fiber components (e.g., components 105A, 105B), then the modified shape of the shapeable resin material and the strength member 110 may be fixed via one or more subsequent curing treatments.

Examples of suitable thermoset resins, UV curable resins, and/or heat curable resins include, but are not limited to, saturated and unsaturated polyester, vinyl ester, one or more phenolics, polybenzimidazole, urea formaldehyde, time delayed epoxy resins, epoxy acrylate, urethane acrylate, and/or any suitable combination of materials. Additionally, in certain embodiments, a combination of different resins may be incorporated into a shapeable resin material. For example, the shapeable resin material may include a first component resin material (e.g., a UV curable resin, etc.) that may be cured in order to encapsulate the strength fibers while still allowing the overall shape of the strength member 110 to be modified. The shapeable resin material may then include a second component resin material (e.g., a heat curable resin, etc.) that may be cured in order to fix the modified shape of the strength member 110 for a desired operating temperature range of the cable 100.

According to an aspect of the disclosure, a shapeable resin material may exist in a state that allows the resin material to be shaped during cable formation. Therefore, a shape of the strength member 110 may be modified during cable formation as the strength member 110 is twisted with one or more fiber optic components 105A, 105B. In other words, the strength member 110 may have a first or original shape along its longitudinal length, and the first shape may be modified during cable formation. Once modified, the second or modified shape of the strength member 110 may be fixed for a desired operating temperature range of the cable. Once fixed, the strength member 110 will not attempt to spring back, unwind, or otherwise return to its original shape.

Example first and modified shapes of the strength member 110 of FIG. 1A are illustrated in FIGS. 1B and 1C respectively. FIG. 1B illustrates a perspective view of the flat strength member 110 in its first or original shape. As shown, the strength member 110 may have a flat cross-sectional shape that is continuous along its longitudinal length. While the strength member is 110 incorporated into the cable 100 of FIG. 1A, the original shape of the strength member 110 may be modified as the strength member 110 is twisted with the optical fiber components 105A, 105B. FIG. 1C illustrates a perspective view of the strength member 110 in its second or modified shape. As shown, the flat strength member 110 may be twisted along its longitudinal direction. In other words, the position of the strength member 110 (e.g., cross-sectional shape, orientation, etc.) relative to a longitudinally extending cross-sectional centerline of the cable 100 may vary along a longitudinal direction of the cable 100 as the strength member 110 is twisted.

In certain embodiments, the shapeable resin material may be activated prior to twisting the strength member 110 with one or more optical fiber components 105A, 105B and modifying the shape of the strength member 110. Certain shapeable resin materials may be heated in order to activate the shapeable resin material prior to modifying the shape of a strength member 110. For example, a thermoplastic resin may be heated in order to soften the resin and permit it to be shaped. As another example, cross-linking of a thermoset resin may be initiated by heat in order to permit the resin to encapsulate the strength fibers while still permitting the shape of the resin to be modified. Other shapeable resin materials may be activated by a wide variety of other suitable methods or techniques. For example, cross-linking of a thermoset resin material may be initiated by UV light, moisture, a catalyst, and/or other suitable methods.

During cable assembly, the strength member 110 may be brought into contact with and/or in close proximity with one or more optical fiber components (e.g., components 105A, 105B, etc.) The shapeable resin may then be shaped in a relatively flexible state as the strength member 110 is twisted with the one or more optical fiber components. In this regard, the shape of a strength member 110 may be modified along its longitudinal length. A wide variety of suitable methods and/or techniques may be utilized to twist the strength member 110 with the fiber component(s) 105A, 105B, such as helical twisting, oscillating reverse twisting, and/or wrapping the strength member 110 around the fiber component(s) 105A, 105B (as shown in FIGS. 4A-4C.

In addition to modifying the shape of the strength member 110 by twisting the strength member 110 with the fiber component(s) 105A, 105B, in certain embodiments, the shape of the strength member may also be modified as a result of pressing one or more of the fiber component(s) 105A, 105B into the strength member 110. For example, as the strength member 110 and fiber component(s) 105A, 105B are bunched and/or twisted, one or more of the fiber components 105A, 105B may press into an outer periphery of the strength member 110 and form concave portions or channels into which the fiber component 105A, 105B are positioned. An example of fiber components that are pressed into a strength member is illustrated and described in greater detail below with reference to FIGS. 2A-2C.

Once the shape of the strength member 110 has been modified, the shapeable resin material may be cured such that the modified shape of the strength member 110 is fixed for a desired operating temperature range of the cable 100. Once cured, the strength member 110 will maintain its modified shape without trying to spring back, untwist, or otherwise return to its original shape. By contrast, if a conventional strength member is twisted with one or more fiber components, a spring back force will cause the strength member to try to untwist and return to its original shape, which will impart undesired forces onto adjacent fiber components. As a result of utilizing a shapeable strength member 110, a strength member 110 may be produced and, as desired, packaged and shipped in an original shape that is optimized for production and transport. The strength member 110 may then be reshaped during cable formation such that the shape of the strength member 110 is optimized for a cable design.

A wide variety of suitable techniques may be utilized as desired in various embodiments to cure a shapeable resin material following the modification of the shape of the strength member 110. Examples of suitable curing techniques include, but are not limited to, cooling, passage of time for a resin that has a time delay for full curing, UV curing, heat curing, etc. In certain example embodiments, a thermoplastic shapeable resin may be cured via suitable cooling, such as cooling over time and/or cooling in a quenching bath. In example embodiments utilizing thermoset resins, a resin may be cured via UV treatment, heat treatment, or other suitable techniques.

According to an aspect of the disclosure, the modified shape of a strength member 110 may be fixed for an operating temperature range of the cable 100. A cable 100 may be designed with a wide variety of suitable operating temperature ranges as desired. For example, an optical fiber cable 100 may have an operating temperature range between approximately −60° C. and approximately 105° C. In certain embodiments, an operating temperature range for a cable 100 may be established by one or more applicable standards, such as the GR-20-CORE standard, issue number 4, published by Telcordia Technologies (now known as iconectiv) in July 2013 and which provides an operating temperature range between −40° C. and approximately 70° C.; the GR-3173-CORE standard, issue number 1, published by Telcordia in February 2014 and which provides an operating temperature range between −40° C. and 70° C.; the ANSI/ICEA S-83-59602016 standard, $5^{th}$ edition, published by the Insulated Cable Engineers Association ("ICEA") in February 2016 and which provides operating temperature ranges between 0° C. and 70° C. or between −20° C. and 70° C. for; the ANSI/ICEA S-87-640-2016 standard, $6^{th}$ edition, published by ICEA in August 2016 and which provides an operating temperature range between −40° C. and 70° C.; the ANSI/ICEA S-104-696-2019 standard, published by ICEA in June 2019 and which provides an operating temperature range between −40° C. and 70° C.; the ANSI/ICEA S-110-717-2019 standard, $3^{rd}$ edition, published by ICEA in March 2019 and which provides an operating temperature range between −40° C. and 70° C.; or the ANSI/ICEA S-115-730-2018 standard, published by ICEA in 2018 and which provides operating temperature ranges of between −40° C. and 70° C., between −20° C. and 70° C., and between 0° C. and 70° C.

With continued reference to FIG. 1A, the outer jacket 115 may enclose the internal components of the cable 100, seal the cable 100 from the environment, and provide strength and structural support. The jacket 115 may include any number of layers (e.g., a single layer, multiple layers, etc.) and may be formed from a wide variety of suitable materials, such as one or more polymeric materials, polyvinyl chloride ("PVC"), polyurethane, a fluoropolymer, polyethylene, neoprene, cholorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 115 can include flame retardant and/or smoke suppressant materials. Additionally, the jacket 115 may include a wide variety of suitable shapes and/or dimensions. For example, as shown in FIG. 1A, the jacket 115 may be formed to result in a round cable or a cable having an approximately circular cross-section. In other embodiments, the jacket 115 may be formed to result in other desired shapes, such as an elliptical shape (e.g., a cable having an approximately oval cross-section), a relatively flat rectangular shape (with or without rounded side edges) suitable for use as a drop cable, or a rectangular shape. The jacket 115 may also have a wide variety of dimensions, such as any suitable or desirable outer diameter and/or any suitable or desirable wall thickness. In various embodiments, the jacket 115 can be characterized as an outer jacket, an outer sheath, a casing, a circumferential cover, or a shell.

The jacket 115 may enclose one or more openings in which other components of the cable 100 are disposed. At least one opening enclosed by the jacket 115 may be referred to as a cable core. In the cable 100 illustrated in FIG. 1A, at least the optical fiber components 105A, 105B and the strength member 110 may be disposed in the cable core. In certain embodiments, the jacket 115 may be extruded or pultruded over the internal components of the cable 100 during cable construction. As desired, one or more access features may be formed into or incorporated into the jacket 115 to facilitate access of the optical fiber components 105A, 105B. For example, one or more peelable or tearable strips, notches, or points of weakness may be incorporated into the jacket 115. In other embodiments, one or more ripcords may be incorporated into the cable core to facilitate easier stripping of the jacket 115.

As desired in various embodiments, a wide variety of other materials may be incorporated into the cable 100. For example, one or more strength rods and/or strength layers may be incorporated into the cable 100. In certain embodiments, as illustrated in FIG. 1A, one or more strength rods 120A, 120B may be embedded in the jacket 115. For example, strength rods 120A, 120B may be embedded in the cable jacket 315 on opposite sides of a cable core. Each strength rod (generally referred to as strength rod 120) may be formed from a wide variety of suitable constructions and/or with a wide variety of suitable dimensions. In certain embodiments, a strength rod 120 may be formed as a solid strength rod. In other embodiments, a strength rod 120 may be formed as a hollow or a partially hollow strength rod (e.g., a strength rod that includes one or more internal cavities and/or supports, etc.). A strength rod 120 may also be formed from a wide variety of suitable materials and/or combinations of material. For example, a strength rod 120 may be formed from one or more dielectric materials. In various embodiments, a strength rod 120 may be formed as a plastic rod, a fiber-reinforced plastic ("FRP") rod, a glass-reinforced plastic ("GRP") rod, a fiberglass rod, or from any other suitable material or combination of materials. In other embodiments, a strength rod 120 may be formed from metallic or conductive materials. Additionally, in various embodiments, a strength rod 120 may be formed with a single layer of material or with a plurality of different layers of material. Further, in certain embodiments, each of the strength rods 120A, 120B included in the cable 100 may be formed with the same dimensions and/or constructions. In other embodiments, at least two strength rods may be formed with different dimensions, material constructions, layer constructions, and/or other parameters.

In other embodiments, a layer of strength yarns, such as aramid yarns, basalt fibers, or other suitable strength yarns, may be positioned between the optical fiber components 105A, 105B and the jacket 115. For example, a layer of strength yarns may be utilized as an inner wrap layer 130 or as a portion of an inner wrap layer. In yet other embodiments, any suitable number of strength yarns 125 may be positioned within the cable core. As desired in other embodiments, the cable 100 may include an armor layer (e.g., a metal armor layer, a corrugated armor layer, etc.). One or more location elements, such as toner wires, may also be incorporated into the cable 100 in various embodiments. A location element may permit the cable 100 to be located, for example, when buried. Additionally, as desired, the cable 100 may include a wide variety of insulating materials, dielectric materials, flame retardants, flame suppressants or extinguishants, and/or other materials.

As desired in various embodiments, water swellable material may be incorporated into the cable 100. For example, water blocking gels, water blocking fibers, water blocking tapes, and/or water blocking yarns may be incorporated into the cable 100. In certain embodiments, a water blocking tape may be positioned within the cable core between the outer jacket 115 and other cable components. In other words, a water blocking tape may be utilized as an inner wrap layer 130 or as a portion of an inner wrap layer. In certain embodiments, the cable 100 may be formed as a dry cable. The term "dry," as used herein in the context of characterizing a fiber optic cable generally indicates that the cable does not contain any fluids, greases, or gels for blocking water incursion. As a result, it may be easier for a technician to install the cable as the technician will not be required to wipe off a grease or gel when the internal contents of the fiber subunit are accessed. In other embodiments, a water blocking gel or other fluid may be incorporated into the cable 100. For example, a cable core may be filled or partially filled with a suitable filling compound, such as a gelatinous, solid, powder, moisture absorbing material, water-swellable substance, dry filling compound, or foam material.

As shown in FIG. 1A, a cable may optionally include an inner wrap or wrap layer 130 positioned between the cable jacket 115 and the other internal components of the cable. An inner wrap 130 may include a single layer or, alternatively, multiple layers of material (i.e., multiple layers of the same material, multiple layers of different materials, etc.). As set forth above, the inner wrap 130 may be formed as or may include a strength layer and/or a water blocking layer. In other embodiments, the inner wrap 130 may be formed as an inner jacket in order to separate the cable core from the outer jacket 115 and the strength rods 120A, 120B. In certain embodiments, an inner wrap 130 may assist in maintaining the positions of the internal components of the cable 100 and/or holding the internal components together. In certain embodiments, the inner wrap 130 may also assist in limiting the migration of various internal components of the cable 100, such as any internal strength yarns, a filling compound, etc.

In the event that the inner wrap 130 includes or is formed as an inner jacket layer, such as an extruded jacket layer, then the inner wrap 130 may include a wide variety of suitable materials. For example, an inner jacket layer may be formed from one or more suitable polymeric materials, such as polyvinyl chloride ("PVC"), polyurethane, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, an inner jacket may optionally include flame retardant materials, smoke suppressant materials, and/or other suitable additives.

In other embodiments, the inner wrap 130 may be formed as one or more binder threads that may be helically or contra helically wrapped around a plurality of internal cable components. In yet other embodiments, the inner wrap 130 may be a single or multi-layer wrap that is longitudinally curled around one or more internal cable components. For example, the inner wrap 130 may be formed as a suitable single or multi-layer tape. As desired, a tape may be bonded, adhered, ultrasonic welded, or otherwise affixed to itself (e.g., affixed with mechanical fasteners, etc.) after it is wrapped or curled around the internal cable component. In other embodiments, a tape may be helically twisted around the internal cable component. As desired, adjacent helical wrappings may overlap one another along a longitudinal length such that the internal cable components are enclosed.

Additionally, an inner wrap 130 may be formed with a wide variety of suitable dimensions as desired in various embodiments. For example, an inner wrap 130 may be formed with any suitable thickness, inner diameter, outer diameter, and/or width (e.g., for tapes, etc.). In certain embodiments, a width may be selected such that a tape wrap may be longitudinally curled around the internal cable components in order to enclose or surround the internal components. Regardless of the construction utilized to form an inner wrap 130, in certain embodiments, the inner wrap 130 may be formed from all dielectric materials. In other embodiments, the inner wrap 130 may incorporate conductive material, such as electrically conductive shielding material. For example, the inner wrap 130 may include a layer of electrically conductive material formed on a dielectric layer or between two dielectric layers.

Turning now to FIG. 2A, a cross-sectional view of a second example optical fiber cable 200 is illustrated. The cable 200 is illustrated as including a plurality of optical fiber components 205A-D, a shapeable strength member 210 twisted with the optical fiber components 205A-D, and a jacket 215 formed around the optical fiber components 205A-D and the shapeable strength member 210. As desired, the cable 200 may include a wide variety of other components, such as strength rods, strength yarns, ripcords, water swellable components, and/or an inner wrap 220 (e.g., a water swellable wrap, an inner jacket, etc.). Each of these components may be similar to those described above with reference to FIG. 1A as desired in various embodiments; however, a few alternative embodiments of certain components that are discussed above with reference to FIG. 1A are illustrated in the cable 200 of FIG. 2A.

First, although FIG. 1A illustrates optical fiber components 105A, 105B that are formed as tight buffered optical fibers, the cable 200 of FIG. 2A illustrates optical fiber components 205A-D that are formed as buffer tubes. Although four buffer tubes 205A-D are illustrated in FIG. 2A, any other suitable number of buffer tubes may be incorporated into a cable 200 and twisted with a shapeable strength member 210. Each buffer tube (generally referred to as buffer tube 205) may be configured to contain or house one or more optical fibers. Any number of optical fibers, other transmission elements, and/or other components may be positioned within a buffer tube. In certain embodiments, optical fibers may be loosely positioned in a buffer tube 205, wrapped or bundled together, or provided in one or more ribbons or ribbon stacks.

Each buffer tube 205 may be formed with any suitable cross-sectional shapes and/or dimensions. For example, the buffer tube 205 may have a circular cross-sectional shape. As another example, the buffer tube 205 may have an inner diameter that facilitates the housing of a desired number of optical fibers. The buffer tube 205 may also be formed with a wide variety of suitable outside diameters. In certain embodiments, the number of buffer tubes 205A-D and the sizes of the buffer tubes 205A-D may be selected in order to provide a desirable cable geometry. For example, the buffer tubes 205A-D and the strength member 210 may be sized such that the cable 200 has a desirable overall cross-sectional shape, such as an approximately circular cross-sectional shape.

A buffer tube 205 may be formed from any suitable materials or combinations of materials. Examples of suitable materials include, but are not limited to, various polymers or polymeric materials, polyethylene ("PE"), high density polyethylene ("HDPE"), polypropylene ("PP"), acrylate or acrylics (e.g., acrylic elastomers, etc.), polyvinyl chloride ("PVC"), polyurethane, a fluoropolymer, neoprene, polyvinylidene fluoride ("PVDF"), polybutylene terephthalate ("PBT"), ethylene, plastic, or other appropriate materials or combinations of suitable materials. Additionally, a buffer 205 110 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins.

Any number of optical fibers may be housed within a buffer tube 205 as desired in various embodiments. Each optical fiber may be similar to the optical fibers discussed above with reference to FIG. 1A. In certain embodiments, a plurality of optical fibers may be loosely positioned within a buffer tube 205. In other embodiments, a plurality of optical fibers may be arranged into one or more suitable bundles or groupings. As desired, each group of fibers may include one or more suitable wraps or binders that maintain the fibers in a group. For example, a wrap or binder may be helically wrapped around the fibers in a group. Examples of suitable binders include, but are not limited to, identification threads (e.g., a colored thread that facilitates identification of a group of optical fibers, etc.), water-blocking threads, strength yarns, etc. In yet other embodiments, a plurality of optical fibers may be arranged into one or more fiber ribbons and/or into a ribbon stack. For example, optical fibers may be formed or incorporated into a plurality of different ribbon arrangements that are stacked on top of one another to form a ribbon stack. As another example, optical fibers may be formed into one or more ribbon arrangements that are folded or otherwise manipulated into a stacked or other configuration. As yet another example, optical fibers may be arranged in one or more ribbons that each include intermittent, spaced, or spiderweb-type bonding that permits the ribbons to be bundled, rolled, and/or otherwise formed into a desired arrangement.

In certain embodiments, a suitable filling compound may be utilize to fill the buffer tube 205. In other words, a filling compound may be utilized to fill the interstitial spaces within the buffer tube 205 that are not occupied by optical fibers (or other components). A wide variety of filling compounds may be utilized as desired. For example, water-blocking gels, grease, foam materials, etc. may be utilized as desired. In other embodiments, the cable 200 may be formed as a "dry" cable that does not include filling compound. As desired, water-blocking tapes, water-blocking wraps, water-blocking yarns, strength yarns (e.g., aramid yarns), water-blocking powders, moisture absorbing materials, dry inserts, and/or a wide variety of other suitable materials may be incorporated into the buffer tube 205.

Additionally, in certain embodiments, one or more dielectric spacers, fillers, or other components may be utilized in place of one or more of the buffer tube 2050A-D. Alternatively, one or more empty buffer tubes may be utilized.

Spacers, fillers, and/or empty buffer tubes may be utilized to provide the cable 200 with a desired overall cross-sectional shape. As one example, a cable 200 may be designed to house a number of optical fibers that may be placed into three buffer tubes. A dielectric filler may be substituted for a fourth buffer tube in order to provide the cable 200 with a desired geometry.

As an alternative to utilizing a loose buffer tube, an optical fiber component may be formed as a microtube. A microtube may house any desired number of optical fibers, such as two, three, four, eight, twelve, or some other number of optical fibers. Additionally, a microtube may have a single layer or multi-layer construction, and the microtube may be formed from any suitable material or combination of materials. A microtube may also be formed with an inner diameter that is sized to allow the optical fibers to move relative to one another while preventing the optical fibers from crossing over or overlapping one another. In other words, the microtube may permit the optical fibers to flex or move as the cable 200 is flexed or bent while simultaneously maintaining the position of each optical fiber relative to the other optical fibers. In certain embodiments, an inner diameter of the microtube may be determined based at least in part on the number of optical fibers to be positioned within the microtube and/or the outer diameters of the optical fibers. As a result of using one or more microtubes, it may be possible to reduce or minimize the diameter of a cable 200 relative to cables that incorporate loose buffer tubes.

With continued reference to FIG. 2A, a shapeable strength member 210 may be positioned adjacent to the optical fiber components 205A-D and twisted with the fiber components 205A-D. Although FIG. 1A illustrates a flat strength member 110, the cable 200 of FIG. 2A is illustrated as including a round or circular strength member 210. The strength member 210 may have a wide variety of suitable dimensions, such as any suitable initial diameter. Additionally, the strength member 210 may be formed from a wide variety of suitable materials and/or via any suitable techniques, such as any of the example materials and techniques described above with reference to FIG. 1A.

Example first and modified shapes of the strength member 210 of FIG. 2A are illustrated in FIGS. 2B and 2C respectively. FIG. 2B illustrates a perspective view of the circular strength member 210 in its first or original shape. As shown, the strength member 210 may have a circular or round cross-sectional shape that is continuous along its longitudinal length. While the strength member is 210 incorporated into the cable 200 of FIG. 2A, the original shape of the strength member 210 may be modified as the strength member 210 is twisted with the optical fiber components 205A-D. Additionally, as shown in FIGS. 2A and 2C, in certain embodiments, the optical fiber components 205A-D may also be pressed into the strength member 210. As a result, one or more channels or grooves 225 may be formed in an outer periphery of the strength member 210, and the optical fiber components 205A-D may be positioned within respective channels. FIG. 2C illustrates a perspective view of the strength member 210 in its second or modified shape. As shown, the round strength member 210 may be twisted along its longitudinal direction. Additionally, the channels or grooves 225 may spiral or twist around an outer periphery of the strength member 210 along the longitudinal direction. In other words, the position of the strength member 210 (e.g., cross-sectional shape, orientation, etc.) and/or portions of the strength member 210 (e.g., the channels 225) relative to a longitudinally extending cross-sectional centerline of the cable 200 may vary along a longitudinal direction of the cable 200 as the strength member 210 is twisted.

Turning now to FIG. 3A, a cross-sectional view of a third example optical fiber cable 300 is illustrated. The cable 300 is illustrated as a hybrid cable that may include one or more optical fiber components 305A, 305B, a shapeable strength member 310 twisted with the optical fiber components 305A, 305B, and a jacket 315 formed around the optical fiber components 305A, 305B and the shapeable strength member 310. Additionally, the hybrid cable 300 may incorporate one or more other types of transmission media, such as the illustrated twisted pairs of individually insulated conductors 320A, 320B. As shown, at least a portion of the other transmission media may be twisted with the strength member 310. In other embodiments, none of the other transmission media is twisted with the strength member. As desired, the cable 300 may include a wide variety of other components, such as strength rods, strength yarns, ripcords, water swellable components, and/or an inner wrap 325 (e.g., a water swellable wrap, an inner jacket, etc.). Each of these components may be similar to those described above with reference to FIG. 1A as desired in various embodiments; however, a few alternative embodiments of certain components that are discussed above with reference to FIG. 1A are illustrated in the cable 300 of FIG. 3A.

First, similar to the cable 200 of FIG. 2A, the optical fiber components 305A, 305B incorporated into the cable 300 of FIG. 3A are illustrated as buffer tubes rather than tight buffered optical fibers. As desired, any suitable types of optical fiber components may be incorporated into a cable 300. Additionally, any desired number of optical fiber components may be incorporated into a cable 300, and the optical fiber components may include a wide variety of suitable materials and/or constructions. The buffer tubes illustrated in FIG. 3A may be similar to those described above with reference to FIG. 2A.

The cable 300 is illustrated as including two twisted pairs 320A, 320B. Each twisted pair (generally referred to as twisted pair 320) may include two electrical conductors, each covered with respective insulation. The electrical conductors of a twisted pair 320 may be formed from any suitable electrically conductive material, such as copper, aluminum, silver, annealed copper, gold, a conductive alloy, etc. Additionally, the electrical conductors may have any suitable diameter, gauge, and/or other dimensions. The twisted pair insulation may include any suitable dielectric materials and/or combination of materials, such as any suitable polymeric insulation materials. Each twisted pair 320 may be configured to carry suitable data and/or power signals. In other embodiments, a hybrid cable 300 may combine a wide variety of other types of transmission media in conjunction with optical fiber components 305A, 305B. These transmission media may include, but are not limited to, one or more twisted pairs, one or more coaxial conductors, one or more power conductors, and/or any suitable combination of multiple types of transmission media. The twisted pairs 320A, 320B depicted in FIG. 3A are provided by way of non-limiting example only.

With continued reference to FIG. 3A, a shapeable strength member 310 may be positioned adjacent to the optical fiber components 305A, 305B and the twisted pairs 320A, 320B. Additionally, the shapeable strength member 310 may be twisted with the optical fiber components 305A, 305B and the twisted pairs 320A, 320B. The cable 300 of FIG. 3A illustrates a strength member 310 having a cross-filler, plus, or X-shaped cross-sectional shape. Such a cross-filler shape may be characterized as having a plurality of prongs or fins that extend from a central point of the strength member 310, thereby creating a plurality of respective channels into which the optical fiber components 305A, 305B, the twisted pairs 320A, 320B, and other cable components may be positioned. The illustrated cross-filler has four prongs or fins; however, it will be appreciated that a strength member 310 may be formed with any desired number of prongs and/or associated channels. Additionally, the strength member 310 may have a wide variety of suitable dimensions, may be formed from a wide variety of suitable materials, and/or may be formed from a wide variety of suitable techniques. The example materials and techniques described above with reference to FIG. 1A are equally applicable to the strength member 310 of FIG. 3A.

Example first and modified shapes of the strength member 310 of FIG. 3A are illustrated in FIGS. 3B and 3C respectively. FIG. 3B illustrates a perspective view of the cross-filler strength member 310 in its first or original shape. As shown, the strength member 310 may have a cross-filler cross-sectional shape that is continuous along its longitudinal length. While the strength member is 310 incorporated into the cable 300 of FIG. 3A, the original shape of the strength member 310 may be modified as the strength member 310 is twisted with the optical fiber components 305A, 305B and the twisted pairs 320A, 320B. As desired in certain embodiments, the optical fiber components 305A, 305B and/or the twisted pairs 320A, 320B may also be pressed into the strength member 310. FIG. 3C illustrates a perspective view of the strength member 310 in its second or modified shape. As shown, the cross-filler strength member 310 and its respective fins or prongs may be twisted along its longitudinal direction. In other words, the position of the strength member 310 (e.g., cross-sectional shape, orientation, etc.) and/or portions of the strength member 310 (e.g., the prongs, any channels, etc.) relative to a longitudinally extending cross-sectional centerline of the cable 300 may vary along a longitudinal direction of the cable 300 as the strength member 310 is twisted.

Turning now to FIG. 4A, a cross-sectional view of a fourth example optical fiber cable 400 is illustrated. The cable 400 is illustrated as a single buffer tube cable in which a shapeable strength member is twisted around the buffer tube. The cable 400 may include an optical fiber component 405, a shapeable strength member 410 twisted with the optical fiber component 405, and a jacket 415 formed around the optical fiber component 405 and the shapeable strength member 410. As desired, the cable 400 may include a wide variety of other components, such as strength rods, strength yarns, ripcords, water swellable components, and/or an inner wrap 420 (e.g., a water swellable wrap, an inner jacket, etc.). Each of these components may be similar to those described above with reference to FIGS. 1A, 2A, and 3A.

Similar to the cables 200, 300 of FIGS. 2A and 3A, the cable 400 of FIG. 4A is illustrated as including a loose buffer tube as an optical fiber component 405. In other embodiments, the cable 400 may be formed with a tight buffered optical fiber, a microtube, or any other suitable optical fiber component. Additionally, although a single optical fiber component 405 is illustrated in FIG. 4A, a plurality of optical fiber components may be incorporated into the cable 400 in other embodiments, and the strength member 410 may be twisted around the plurality of optical fiber components or a subset of the optical fiber components. In yet other embodiments, the cable 400 may be formed as a hybrid cable, and the strength member 410 may be twisted around any desired number of optical fiber components and/or other transmission media. In yet other embodiments, a plurality of strength members may be incorporated into the cable 400, and each strength member may be selectively twisted around and/or twisted with any desired optical fiber component(s) and/or other components of the cable.

With continued reference to FIG. 4A, a shapeable strength member 410 may be positioned adjacent to the optical fiber component 405 and twisted with the optical fiber component 405. As shown, the strength member 410 is twisted around the optical fiber component 405. The strength member 410 is illustrated as a strength member having a flat cross-sectional shape; however, strength members having other suitable cross-sectional shapes (e.g., a round or circular shape, etc.) may be twisted around one or more optical fiber components in other embodiments. Additionally, the strength member 410 may have a wide variety of suitable dimensions, may be formed from a wide variety of suitable materials, and/or may be formed from a wide variety of suitable techniques. The example materials and techniques described above with reference to FIG. 1A are equally applicable to the strength member 410 of FIG. 4A.

Example first and modified shapes of the strength member 410 of FIG. 4A are illustrated in FIGS. 4B and 4C respectively. FIG. 4B illustrates a perspective view of the flat strength member 410 in its first or original shape positioned adjacent to an optical fiber component 405. As shown, the strength member 410 may have a flat cross-sectional shape that is continuous along its longitudinal length. While the strength member is 410 incorporated into the cable 400 of FIG. 4A, the original shape of the strength member 410 may be modified as the strength member 410 is twisted around the optical fiber component 405. FIG. 3C illustrates a perspective view of the strength member 410 in its second or modified shape. As shown, the flat strength member 410 may be twisted around the optical fiber component 405 along its longitudinal direction. In other words, the position of the strength member 410 relative to a longitudinally extending cross-sectional centerline of the cable 400 may vary along a longitudinal direction of the cable 400 as the strength member 410 is twisted.

The cables 100, 200, 300, 400 illustrated in FIGS. 1A, 2A, 3A, and 4A are provided by way of non-limiting example only. A wide variety of other components may be incorporated into a cable as desired in other embodiments. For example, a cable may include a wide variety of suitable strength member constructions, transmission media, a wide variety of different types of tubes, water-blocking materials, water-swellable materials, insulating materials, dielectric materials, gels, fillers, and/or other materials. Additionally, a cable may be designed to satisfy any number of applicable cable standards. Further, the strength members illustrated in FIGS. 1A-4C are provided by way of non-limiting example only. A wide variety of other suitable strength members may be incorporated into a cable as desired. These strength members may include any suitable cross-sectional shapes, dimensions, constructions, and/or components.

Figure 5:
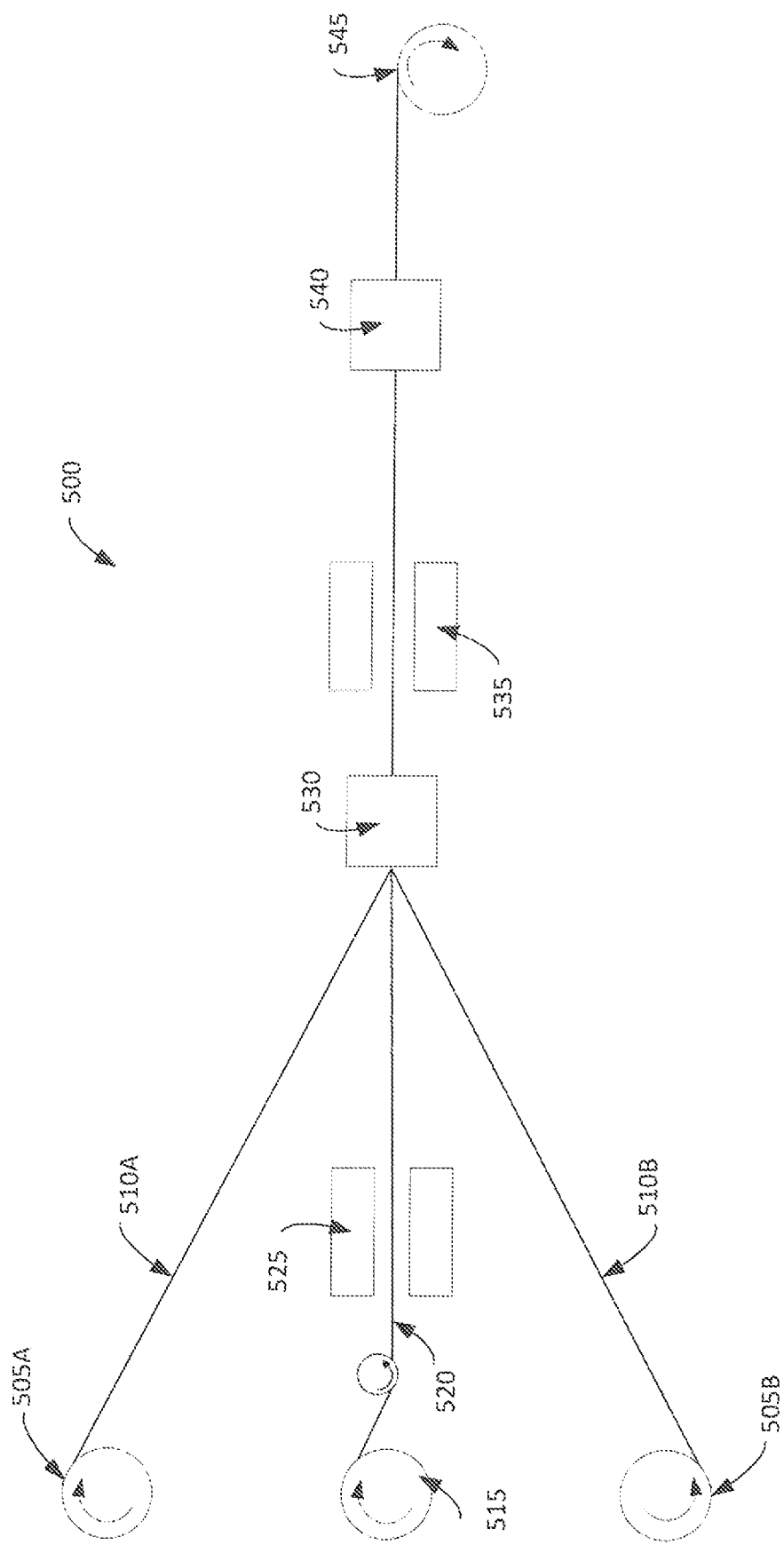
FIG. 5 is a block diagram of an example system that may be utilized to form a cable that includes a shapeable strength member, according to an illustrative embodiment of the disclosure.

A wide variety of suitable systems, devices, and/or manufacturing techniques may be utilized as desired to assembly a cable that includes a shapeable strength member. FIG. 5 is a block diagram of an example system 500 that may be utilized to form a cable that includes a shapeable strength member, according to an illustrative embodiment of the disclosure. The system 500 may include one or more sources 505A, 505B of optical fiber components 510A, 510B, a source 515 for a shapeable strength member 520, one or more activation devices 525, a twisting device 530, one or more curing devices 535, a jacket extrusion device 540 and a suitable take-up device 545. Each of these components is described in greater detail below.

The sources 505A, 505B for the optical fiber components 510A, 510B may include any suitable reels, bins, payoffs, or other sources configured to provide one or more suitable optical fiber components for incorporation into a cable. For example, the sources 505A, 505B may be configured to provide tight buffered optical fibers, buffer tubes, and/or other suitable components. In certain embodiments, the optical fiber components 510A, 510B may be preformed or formed in an offline manner and subsequently provided by the sources 505A, 505B for incorporation into a cable. In other embodiments, optical fiber components 510A, 510B may be formed during cable construction. In other words, the sources 505A, 505B may include or may be in communication with one or more upstream devices configured to form a desired number of optical fiber components 510A, 510B, such as components that form tight buffer layers around optical fibers and/or components that form optical fiber buffer tubes.

The strength member source 515 may be configured to provide a strength member 520 having a first or initial shape. As discussed in greater detail above with reference to FIG. 1A, the strength member 520 may have a wide variety of suitable cross-sectional shapes and/or dimensions. Additionally, the strength member 520 may be formed from a wide variety of suitable materials, such as any suitable strength fibers and/or shapeable resin materials. In certain embodiments, the strength member source 515 may be a suitable bin, reel, payoff, or other component configured to provide a preformed strength member 520. In other embodiments, the source 515 may include or be in communication with one or more upstream devices configured to form a strength member 515 in an online manner and provide the strength member 515 for incorporation into a cable.

In certain embodiments, the system 500 may include one or more activation devices 525 configured to activate the shapeable resin material of the strength member 520 prior to the strength member 520 being twisted with the optical fiber components 510A, 510B. A wide variety of suitable activation devices 525 may be utilized as desired in various embodiments. For example, the activation devices 525 may include one or more heating devices configured to soften a thermoplastic resin. As another example, the activation devices 525 may include one or more devices configured to initiate cross-linking of a thermoset or other suitable resin, such as one or more UV light devices, one or more devices that introduce a catalyst to a shapeable resin material, one or more heating devices that initiate heat curing of a resin, etc.

The optical fiber components 510A, 510B and the shapeable strength member 520 may be provided to one or more suitable twisting devices 530 configured to twist or strand the fiber components 510A, 510B and the strength member 520 together. The fiber components 510A, 510B and the strength member 520 may be bunched together via any suitable devices, such as a bunching die. A twisting device 530 may then twist the strength member 520 and the optical fiber components 510A, 510B together. For example, one or more twisting devices 530 may helically twist the strength member 520 and fiber components 510A, 510B together, may reverse oscillate twist the strength member 520 and fiber components 510A, 510B together, or may twist the strength member 520 around the fiber components 510A, 510B. The twisting device(s) 530 may carry out the twisting at any suitable lay length or other twist rate.

According to an aspect of the disclosure, a shape of the strength member 520 may be modified along its longitudinal length based at least in part on the twisting performed by the twisting device(s) 530. In certain embodiments, the shape of the strength member 520 may also be modified as a result of the fiber components 510A, 510B being pressed into the strength member 520. In other words, the strength member 520 may have a first cross-sectional shape prior to twisting, and the first shape may be altered into a second or modified shape during twisting.

Once the shape of the strength member 520 has been modified, the shapeable resin material may be cured via any number of suitable curing devices 535 such that the modified shape of the strength member 520 is fixed for a desired operating temperature range of a cable. A wide variety of suitable curing devices 525 may be utilized as desired in various embodiments to cure the shapeable resin material. Examples of suitable curing devices 525 include, but are not limited to, cooling troughs or other cooling devices, one or more UV light curing devices, one or more heat curing devices, etc. In other embodiments, curing of the shapeable resin may be facilitate via passage of time without the use of curing device(s) 535.

Following curing of the shapeable resin material, a wide variety of other suitable components may be incorporated into a cable. For example, the system 500 may include one or more payoffs or other sources configured to supply strength yarns, ripcords, and/or other suitable components into a cable. As another example, one or more suitable wrapping dies or other components may be configured to form one or more wrap layers (e.g., a water blocking tape, etc.) around the fiber components 510A, 510B, strength member 520, and/or other components of the cable 500. As yet another example, one or more suitable extrusion crossheads and/or other extrusion devices may be configured to form an inner jacket around internal components of the cable.

Once an internal construction of a cable has been achieved, one or more suitable jacket extrusion devices 540 (e.g., an extrusion crosshead, etc.) may be utilized to extrude an outer jacket around the internal components of the cable. As desired, one or more strength rods or other strength members may be provided by any number of suitable sources (e.g., payoffs, reels, bins, etc.) and encapsulated by the extruded jacket. Following formation of the jacket, a suitable take up device 545 may collect or gather the final cable. For example, the cable may be spooled onto a reel or coiled into a box or other suitable packaging.

A wide variety of other components and/or devices may be incorporated into the system 500 as desired in various embodiments. For example, any number of rollers and/or dancers, such as the illustrated rollers may be utilized to pull or otherwise advance materials through the system 500. Any number of motors or other drive components may be utilized to power various components of the system 500 and/or to control line speed. As desired, the motors may be collectively or independently controlled by any number of suitable computing and/or control devices.

Figure 6:
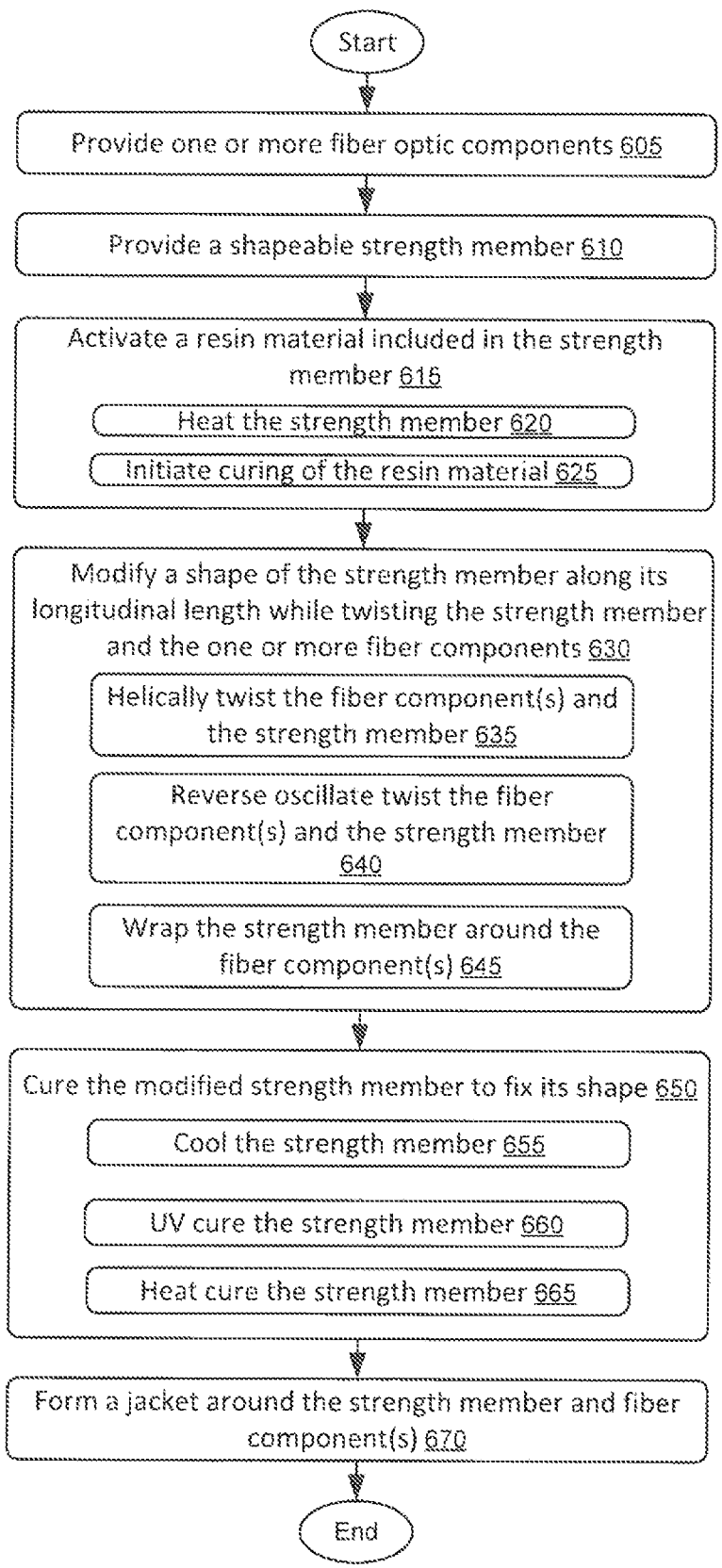
FIG. 6 is a flowchart of an example method that may be utilized to form a cable that includes a shapeable strength member, according to illustrative embodiments of the disclosure.

FIG. 6 is a flowchart of an example method 600 that may be utilized to form a cable that includes a shapeable strength member, according to illustrative embodiments of the disclosure. The method 600 may begin at block 605, and one or more optical fiber components 605 may be provided. A wide variety of suitable fiber components may be provided as desired in various embodiments, such as tight buffered optical fibers, buffer tubes, microtubes, etc. Additionally, any suitable number of fiber components may be provided as desired.

At block 610, a shapeable strength member may be provided. The shapeable strength member may be similar to the shapeable strength members described above with reference to FIGS. 1A-4C. As such, the shapeable strength member may include a plurality of strength fibers encapsulated in a shapeable resin material. Additionally, the strength member may have a wide variety of suitable constructions, cross-sectional shapes, and/or dimensions. The strength member may also be formed from a wide variety of suitable materials.

At block 615, which may be optional in certain embodiments, the shapeable resin material included in the strength member may be activated by any number of suitable techniques. For example, a shapeable resin material (e.g., a thermoplastic resin material) may be softened as a result of heating the strength member at block 620. As another example, curing of a shapeable resin material may be initiated at block 625 via any number of suitable techniques, such as heating, application of UV light, introduction of a catalyst, etc.

At block 630, a shape of the strength member may be modified along its longitudinal length while the strength member and the one or more optical fiber components are twisted together. A wide variety of suitable types of twisting may be performed as desired in various embodiments. For example, at block 635, the fiber component(s) and the strength member may be helically twisted together. As another example, at block 640, the fiber component(s) and the strength member may be reverse oscillated twisted. As yet another example, at block 645, the strength member may be wrapped or twisted around the fiber component(s).

At block 650, the shapeable resin material of the strength member may be cured in order to fix the modified shape of the strength member for desired operating parameters of a cable, such as a desired operating temperature range of the cable. A wide variety of suitable methods and/or techniques may be utilized as desired to cure the shapeable resin material. For example, at block 655, the strength member may be cooled via passage of time, a quenching bath, and/or any other suitable cooling techniques. As another example, at block 660, the strength member may be cured via application of UV light. As yet another example, at block 665, the strength member may be cured via application of heat by one or more suitable heating devices. Other suitable curing methods may be utilized as desired.

At block 670, a jacket may be formed around the modified strength member and the one or more optical fiber components. For example, a jacket may be extruded around the internal components of a cable. As desired, a wide variety of other components may be incorporated into the cable prior to formation of the jacket including, but not limited to, strength rods, strength yarns, water blocking materials, inner jackets, wrap layers, etc. The method 600 may then end following block 670.

As desired, the method 600 may include more or less operations than those illustrated in FIG. 6. Additionally, as desired, certain operations of the method 600 may be formed in parallel or in a different order than that set forth in FIG. 6. Indeed, the method 600 is provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A method for forming a cable, the method comprising:
    providing a strength member comprising a plurality of strength fibers positioned within a shapeable resin material, the shapeable resin material comprising a plurality of curable component materials;
    curing a first of the plurality of curable component materials to activate the shapeable resin material;
    modifying, subsequent to activating the shapeable resin material, a shape of the strength member along its longitudinal length while twisting the strength member with one or more fiber optic components;
    curing a second of the plurality of curable component materials to fix the modified shape of the strength member within a desired operating temperature range of the cable; and
    forming a jacket around the strength member and the one or more optical fiber components.

2. The method of claim 1, wherein providing a strength member comprising a plurality of strength fibers comprises providing a strength member comprising at least one of glass fibers, liquid crystal polymer fibers, basalt fibers, boron fibers, polybenzoxazole fibers, or carbon fibers.

3. The method of claim 1, wherein providing a strength member comprising a plurality of strength fibers comprises providing a strength member comprising a plurality of longitudinally continuous strength fibers.

4. The method of claim 1, wherein providing a strength member comprising a plurality of strength fibers positioned within a shapeable resin material comprises providing a strength member comprising a plurality of strength fibers positioned within at least one of a UV curable resin material, (ii) a cationic UV curable resin material, or (iii) a heat curable resin material.

5. The method of claim 1, wherein providing a strength member comprises providing a strength member comprising a shapeable resin material with both a UV curable material and a heat curable material included in the plurality of curable component materials.

6. The method of claim 5, wherein:
curing a first of the plurality of component materials comprises curing the UV curable material, and
curing a second of the plurality of component materials comprises curing the heat curable material.

7. The method of claim 1, wherein:
providing a strength member comprises providing a strength in which the plurality of strength fibers occupy at least eighty percent of a total cross-sectional area of the strength member.

8. The method of claim 1, wherein modifying a shape of the strength member along its longitudinal length while twisting the strength member with one or more fiber optic components comprises one of (i) helically twisting the strength member and the one or more fiber optic components, (ii) oscillating reverse twisting the strength member and the one or more fiber optic components, or (iii) wrapping the strength member around the one or more fiber optic components.

9. The method of claim 1, wherein fixing the modified shape of the strength member comprises one of (i) cooling the strength member, (ii) UV curing the strength member, or (iii) heat curing the strength member.

10. The method of claim 1, wherein modifying the shape of the strength member further comprises pressing the one or more fiber optic components into the strength member.

11. A method for forming a cable, the method comprising:
providing a strength member having a first shape along a longitudinal length and comprising a plurality of strength fibers positioned within a shapeable resin material, the shapeable resin material comprising a plurality of curable component materials;
curing a first of the plurality of curable component materials to activate the shapeable resin material;
modifying, subsequent to activating the shapeable resin material, the strength member to have a second shape along the longitudinal length different than the first shape;
positioning one or more fiber optic components adjacent to the strength member;
curing a second of the plurality of curable components materials to fix the second shape of the strength member within a desired operating temperature range of the cable; and
forming a jacket around the strength member and the one or more optical fiber components.

12. The method of claim 11, wherein modifying, the strength member to have a second shape along the longitudinal length comprises modifying the strength member to have a second shape while the strength member is twisted with the one or more fiber optic components, the twisting comprising one of (i) helically twisting the strength member and the one or more fiber optic components, (ii) oscillating reverse twisting the strength member and the one or more fiber optic components, or (iii) wrapping the strength member around the one or more fiber optic components.

13. The method of claim 12, wherein modifying the strength member further comprises pressing the one or more fiber optic components into the strength member.

14. The method of claim 11, wherein providing a strength member comprising a plurality of strength fibers comprises providing a strength member comprising at least one of glass fibers, liquid crystal polymer fibers, basalt fibers, boron fibers, polybenzoxazole fibers, or carbon fibers.

15. The method of claim 11, wherein providing a strength member comprising a plurality of strength fibers comprises providing a strength member comprising a plurality of longitudinally continuous strength fibers.

16. The method of claim 1, wherein providing a strength member comprising a plurality of strength fibers positioned within a shapeable resin material comprises providing a strength member comprising a plurality of strength fibers positioned within at least one of (i) a UV curable resin material, (ii) a cationic UV curable resin material, or (iii) a heat curable material.

17. The method of claim 11, wherein providing a strength member comprises providing a strength member comprising a shapeable resin material with both a UV curable material and a heat curable material included in the plurality of curable component materials.

18. The method of claim 17, wherein:
curing a first of the plurality of component materials comprises curing the UV curable material, and
curing a second of the plurality of component materials comprises curing the heat curable material.

19. The method of claim 11, wherein:
providing a strength member comprises providing a strength in which the plurality of strength fibers occupy at least eighty percent of a total cross-sectional area of the strength member.

20. The method of claim 11, wherein fixing the second shape of the strength member comprises one of (i) cooling the strength member, (ii) UV curing the strength member, or (iii) heat curing the strength member.

* * * * *